United States Patent
Tanabe et al.

(10) Patent No.: US 8,403,747 B2
(45) Date of Patent: Mar. 26, 2013

(54) STORAGE MEDIUM STORING GAME PROGRAM FOR PROVIDING PLAY-AGAINST-TYPE GAME IN WHICH MULTIPLE PLAYERS CAN PARTICIPATE, GAME DEVICE, AND GAME SYSTEM

(75) Inventors: Kensuke Tanabe, Kyoto (JP); Risa Tabata, Kyoto (JP); Masao Suganuma, Shibuya-ku (JP)

(73) Assignee: Nintendo Co., Ltd., Kyoto (JP)

( * ) Notice: Subject to any disclaimer, the term of this patent is extended or adjusted under 35 U.S.C. 154(b) by 800 days.

(21) Appl. No.: 12/553,392

(22) Filed: Sep. 3, 2009

(65) Prior Publication Data
US 2010/0317432 A1 Dec. 16, 2010

(30) Foreign Application Priority Data
Jun. 10, 2009 (JP) ................................. 2009-139249

(51) Int. Cl.
G06F 19/00 (2011.01)
A63F 13/00 (2006.01)
A63F 9/24 (2006.01)
(52) U.S. Cl. ................. 463/30; 463/42; 463/43
(58) Field of Classification Search ............ 463/1, 9–13, 463/42–44, 30; 273/241, 242, 292; 700/91–93
See application file for complete search history.

(56) References Cited

U.S. PATENT DOCUMENTS

| | | | | |
|---|---|---|---|---|
| 3,948,525 A * | 4/1976 | Faintuch et al. | ............... | 273/273 |
| 4,059,274 A * | 11/1977 | Samson et al. | ................ | 273/265 |
| 4,241,923 A * | 12/1980 | Meirovitz | ..................... | 273/265 |
| 4,565,373 A * | 1/1986 | Ungar | .......................... | 273/265 |
| 4,716,529 A * | 12/1987 | Nakayama | ..................... | 463/14 |
| 6,203,430 B1 * | 3/2001 | Walker et al. | .................... | 463/20 |
| 6,203,433 B1 * | 3/2001 | Kume | ............................. | 463/42 |
| 6,332,838 B1 * | 12/2001 | Yamagami | ....................... | 463/9 |
| 7,094,147 B2 * | 8/2006 | Nakata et al. | ...................... | 463/9 |
| 7,591,722 B2 * | 9/2009 | Baerlocher et al. | ............... | 463/9 |
| 7,651,094 B1 * | 1/2010 | Hart | .............................. | 273/241 |
| 2002/0160836 A1 * | 10/2002 | Watanabe et al. | ............... | 463/42 |

(Continued)

FOREIGN PATENT DOCUMENTS
JP 9-290041 11/1997

OTHER PUBLICATIONS

"Virtual Console Gobang Renju," Nintendo Co., [Online], [Searched on Apr. 14, 2009], Internet URL:http://nintendo.co.jp/wii/vc/vc_go/vc_go02.html.

*Primary Examiner* — Michael Cuff
*Assistant Examiner* — Jason Skaarup
(74) *Attorney, Agent, or Firm* — Nixon & Vanderhye P.C.

(57) ABSTRACT

When a game is started, at least two types of pieces obtained based on random extraction from prepared types of pieces are set in advance for each player as his/her own assigned pieces (assigned objects). When the game ends as a prescribed condition is satisfied, an evaluation value of each player is calculated based on a cumulative value at that time point of the assigned pieces set for that player. The assigned piece defines the type of the piece to be evaluated for each player. Here, as a difference between a cumulative value of one assigned piece and a cumulative value of the other assigned piece is greater, a higher evaluation value is calculated. Typically, the difference (absolute value) between the cumulative values of the respective assigned pieces is calculated as the evaluation value.

22 Claims, 21 Drawing Sheets

U.S. PATENT DOCUMENTS

| | | | |
|---|---|---|---|
| 2003/0027615 A1* | 2/2003 | Sousumi | 463/14 |
| 2003/0125100 A1* | 7/2003 | Cannon | 463/16 |
| 2004/0041344 A1* | 3/2004 | Thomson | 273/241 |
| 2007/0184886 A1* | 8/2007 | Floden | 463/14 |
| 2008/0258387 A1* | 10/2008 | Lu et al. | 273/272 |
| 2009/0197677 A1* | 8/2009 | Takeda | 463/31 |

* cited by examiner

GAME IN PROGRESS

FIG.5
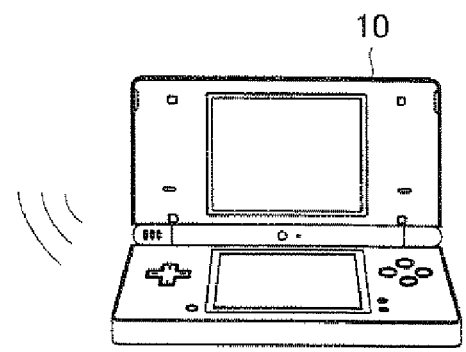
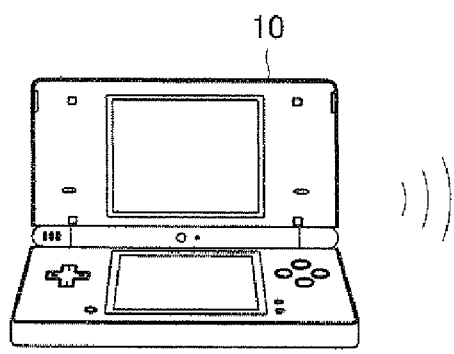
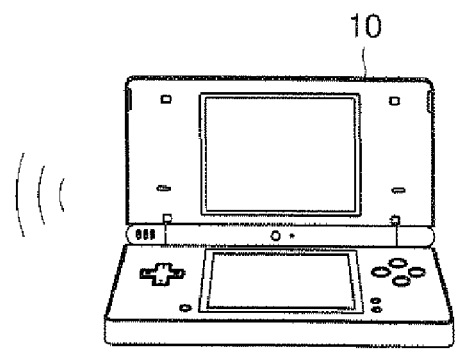
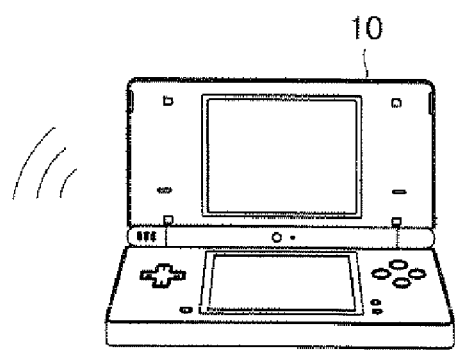

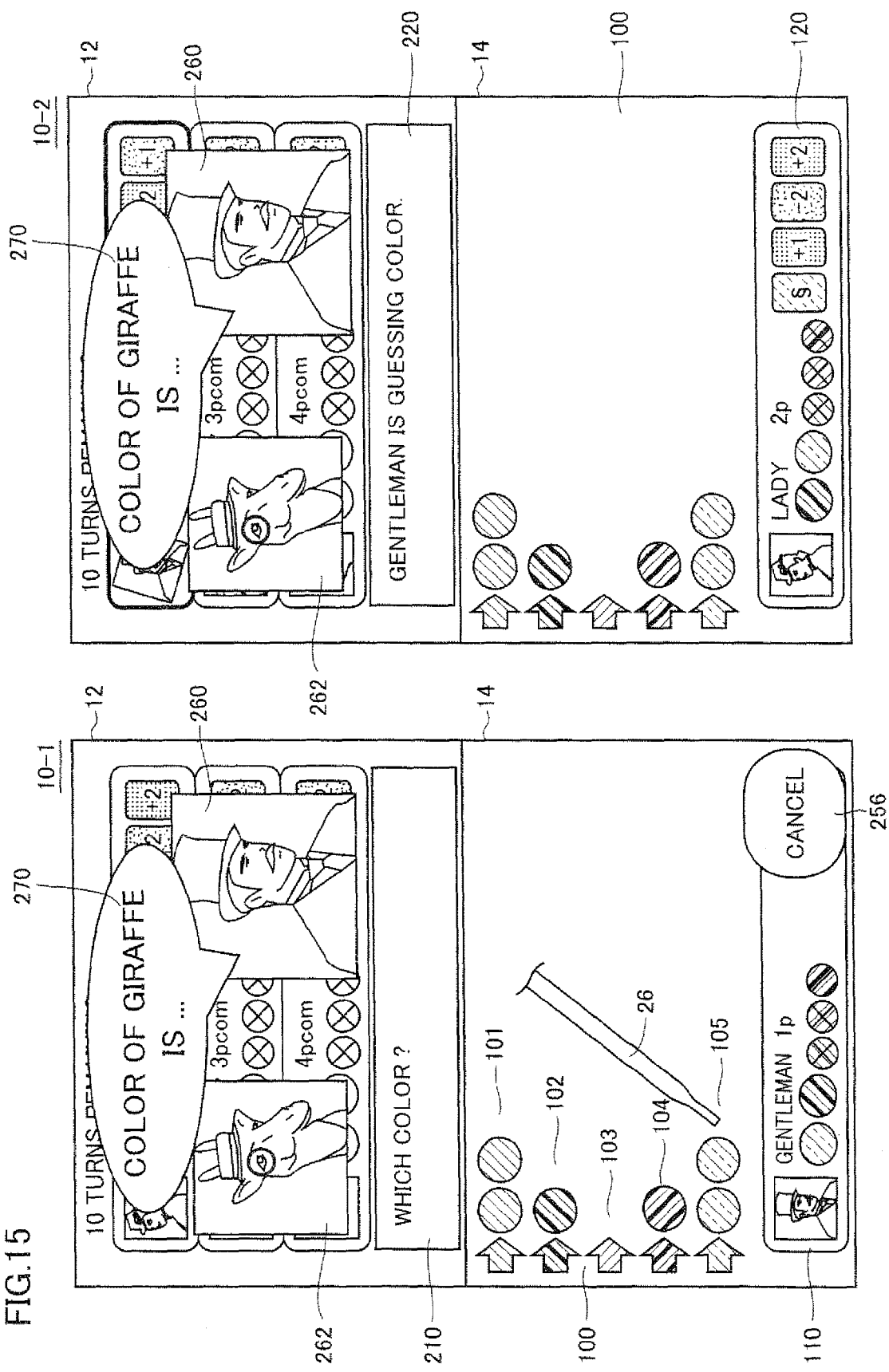

FIG. 18
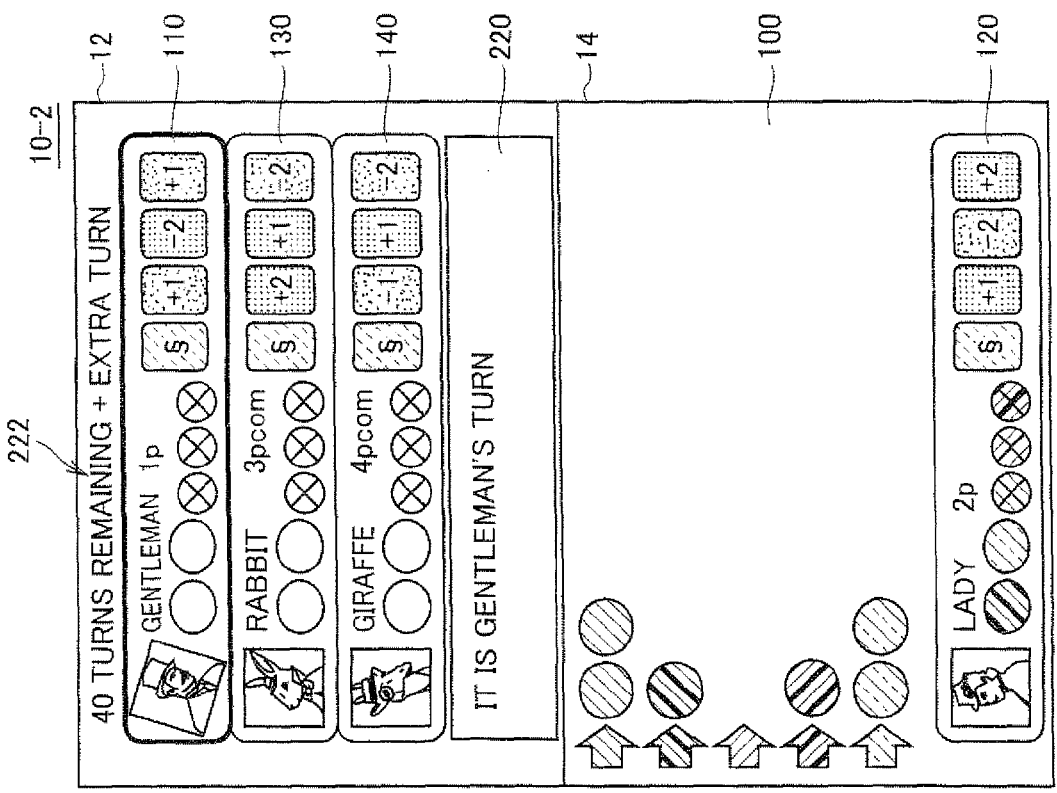
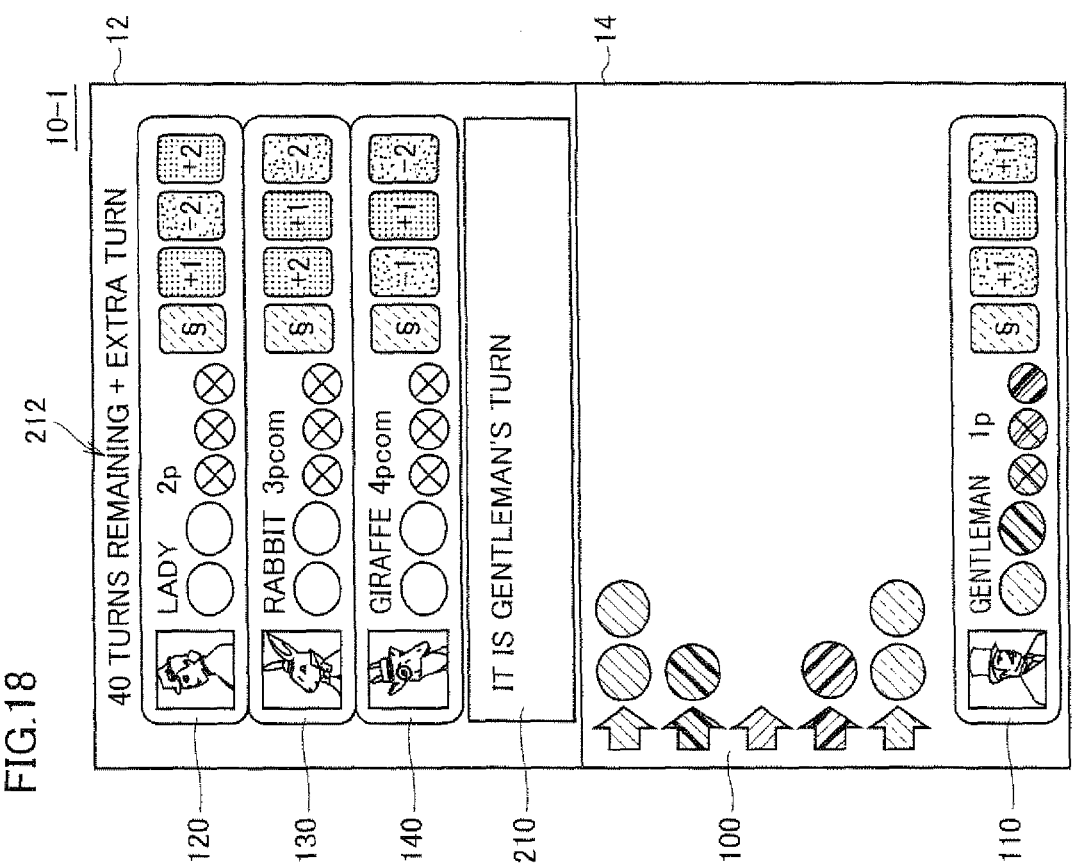

FIG.19
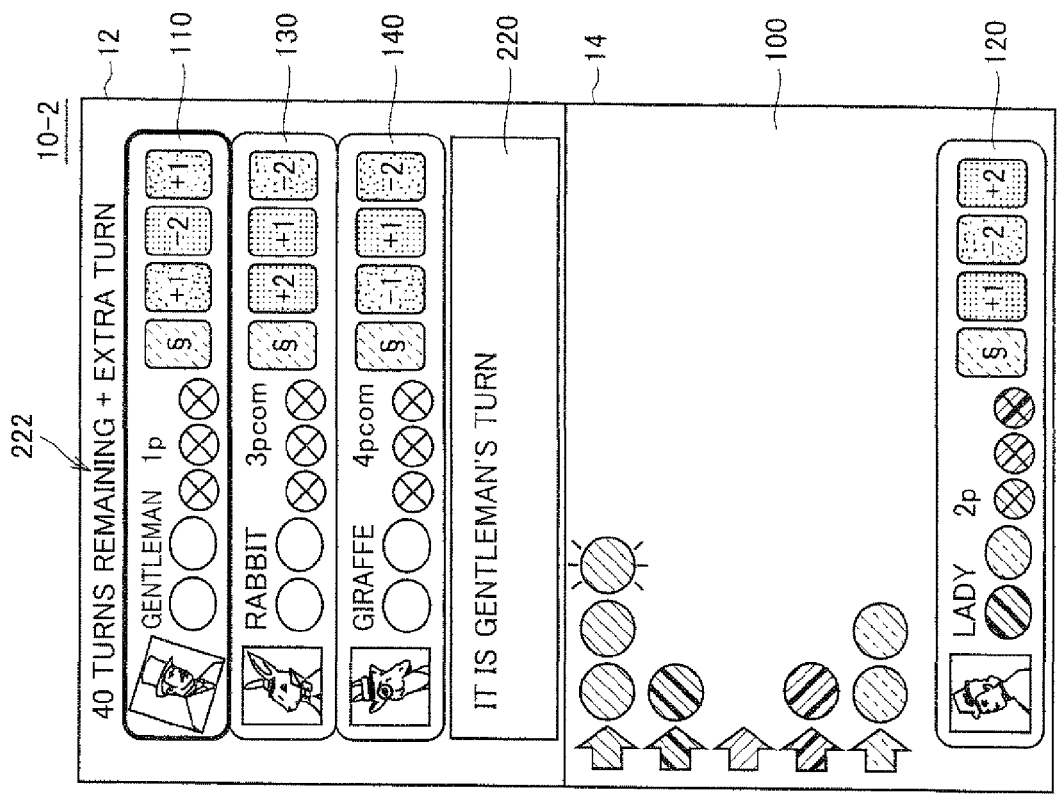
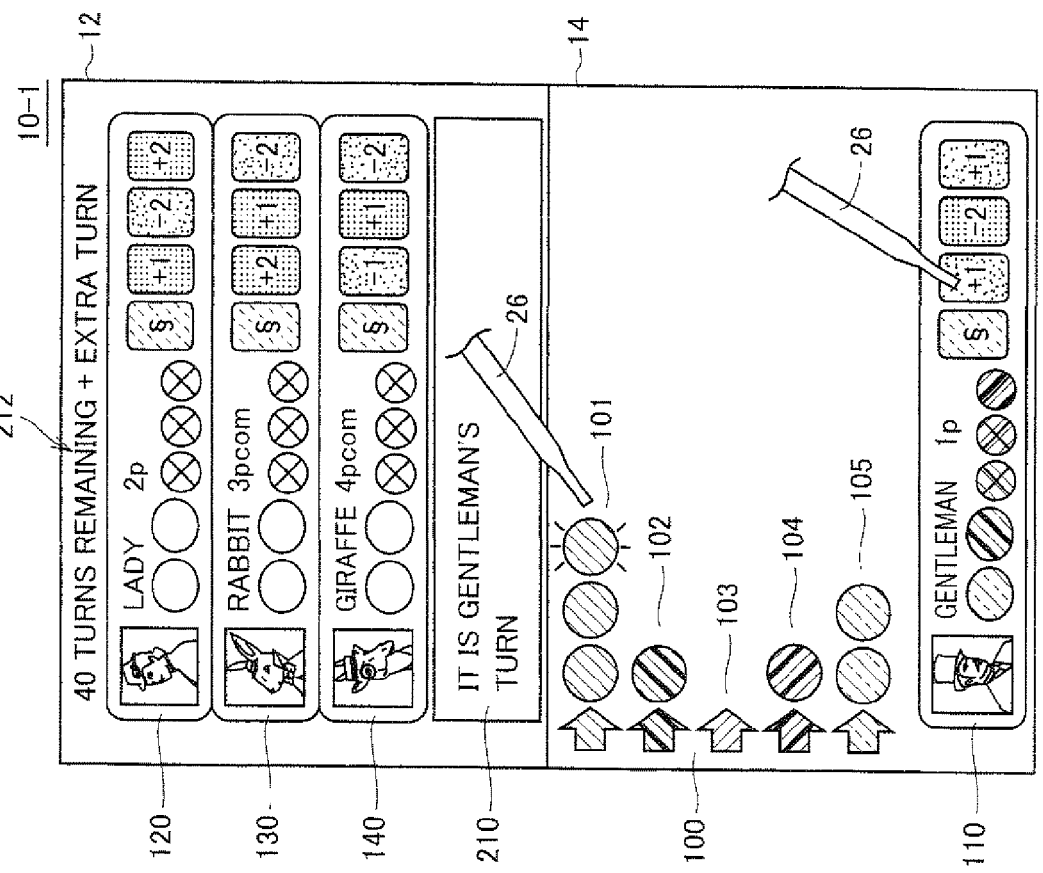

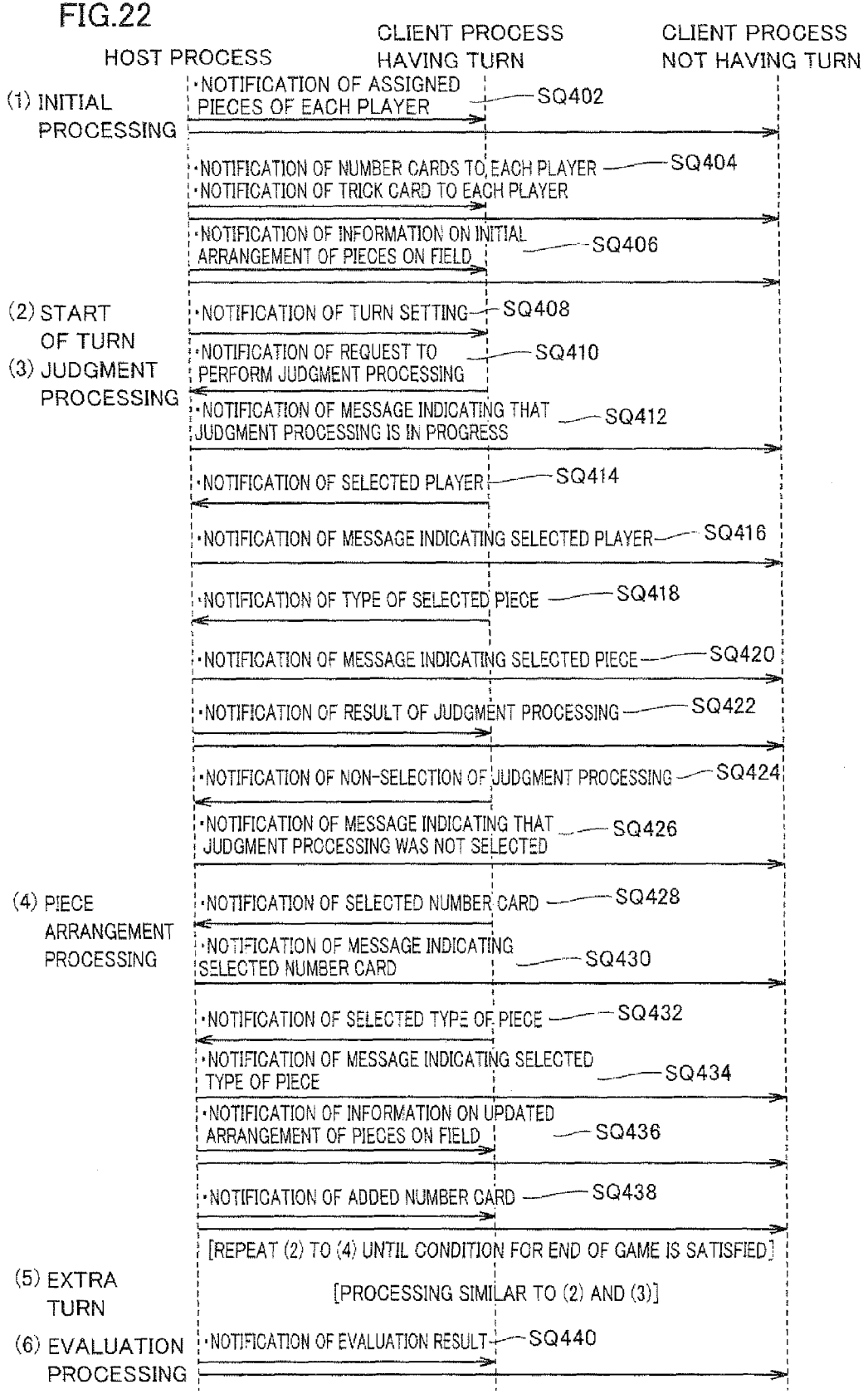

STORAGE MEDIUM STORING GAME PROGRAM FOR PROVIDING PLAY-AGAINST-TYPE GAME IN WHICH MULTIPLE PLAYERS CAN PARTICIPATE, GAME DEVICE, AND GAME SYSTEM

This nonprovisional application is based on Japanese Patent Application No. 2009-139249 filed on Jun. 10, 2009 with the Japan Patent Office, the entire contents of which are hereby incorporated by reference.

BACKGROUND OF THE INVENTION

1. Field of the Invention

The present invention relates to a storage medium storing a game program for providing a play-against-type game in which a plurality of players can participate, a game device, and a game system.

2. Description of the Background Art

A program for providing a play-against-type game through interaction with a computer has conventionally been known. For instance, an example providing a play-against-type board game through interaction with a computer is disclosed. "Virtual Console Gobang Renju" provided by Nintendo Co., Ltd. discloses a board game representing what is called "gobang", in which the first player places a black stone and the second player places a white stone alternately on a grid board and the player who successfully placed five stones in a row, in any of vertical, horizontal and diagonal directions wins.

In addition, Japanese Patent Laying-Open No. 9-290041 discloses a board game, in which two players place a piece on an equilateral triangle arranged on the board and a winning technique is defined as a large equilateral triangle consisting of four equilateral triangles, a regular hexagon consisting of five combined trapezoids each consisting of three equilateral triangles, or the like.

In the board games disclosed in the prior documents above, however, one type of piece allocated to each player is placed on a field defined in advance and the number of types of pieces that can be placed on the field cannot be increased. Therefore, a degree of freedom in placement of pieces is not much great, and hence the game is less strategic and a user tends to lose interest.

SUMMARY OF THE INVENTION

The present invention was made to solve such a problem, and an object of the present invention is to provide a storage medium storing a novel game program attracting interests and having highly strategic characteristics, a game device, and a game system.

According to a first aspect of the present invention, a storage medium storing a game program for providing a play-against-type game in which a plurality of players can participate, in a game device having an input portion and a display, is provided. The present game program includes cumulative number display instructions for displaying cumulative numbers of respective three or more types of arranged objects, assigned object setting instructions for setting, for each player, at least two types of arranged objects obtained by extracting a part of the three or more types of arranged objects as assigned objects of that player, cumulative number update instructions for updating the cumulative number of the arranged object of a designated type, in accordance with at least one of an indication through the input portion and an indication from another player, game end determination instructions for determining whether a condition for end of the game is satisfied or not, and evaluation instructions for evaluating each player based on the respective cumulative numbers of at least two types of arranged objects set as the assigned objects for each player when it is determined that the condition for end of the game is satisfied.

According to the first aspect, at least two types of arranged objects (in a typical embodiment, "pieces") among three or more types of arranged objects are set as assigned objects for each player. Under such a condition, each player alternately changes the cumulative number of the arranged object considered as necessary among the three or more types of arranged objects until it is determined that the condition for end of the game is satisfied. At the time point of the end of the game, each player is evaluated based on the cumulative values of the arranged objects set for each player. In other words, the cumulative value of the arranged object different from the assigned object set for each player is not taken into consideration in evaluation. Therefore, a pattern as to which cumulative value of the three or more types of arranged objects is to be changed can be varied. Accordingly, a play-against-type game having highly strategic characteristics, interest in which is less likely to be lost, can be provided.

According to a preferred second aspect of the present invention, the condition for end of the game includes a condition that the cumulative number of at least one type of arranged object has attained to a prescribed number.

According to the second aspect, the condition for end of the game can be associated with an operation by each player. Accordingly, for example, when a situation is advantageous for a player himself/herself, such a strategy as increasing a cumulative value of a specific arranged object so as to end the game earlier can be adopted. On the other hand, when a situation is disadvantageous for the player himself/herself, such a strategy as decreasing the cumulative value of the arranged object so as to prevent the game from ending early can be adopted. Thus, each player is caused to consider various tactics depending on a situation and the strategic characteristics are enhanced.

According to a preferred third aspect of the present invention, the condition for end of the game includes a condition that the number of times of update in accordance with the cumulative number update instructions has attained to a prescribed number.

According to the third aspect, each player can be caused to consider such an optimal pattern for accumulating the arranged object as obtaining higher evaluation without exceeding the number of times of operations limited as a whole and the strategic characteristics are enhanced.

According to a preferred fourth aspect of the present invention, the evaluation instructions include evaluation value calculation instructions for calculating an evaluation value of each player and winner determination instructions for determining a winner among the plurality of players based on the evaluation value of each player, each of the assigned objects set for the player includes first and second arranged objects, and the evaluation value calculation instructions are adapted to calculate, for each player, a higher evaluation value as a difference between a cumulative number of the corresponding first arranged object and a cumulative number of the corresponding second arranged object is greater.

According to the fourth aspect, as the difference in the cumulative value of the assigned object at the time point of end of the game affects evaluation and victory and defeat, each player can be caused to consider such an optimal pattern for accumulating the arranged object as increasing the difference between the cumulative values, and brainwork and the strategic characteristics are enhanced.

According to a preferred fifth aspect of the present invention, the evaluation value calculation instructions are adapted to set, for each player, a corresponding evaluation value to a minimum value when at least one of the cumulative number of the corresponding first arranged object and the cumulative number of the corresponding second arranged object is equal to or lower than a prescribed threshold value.

According to the fifth aspect, it is necessary for a cumulative value of one of the assigned objects set for each player to exceed a prescribed threshold value (in a typical embodiment, zero). On the other hand, in order to obtain higher evaluation, a cumulative value of one of other set assigned objects should be greater. Therefore, brainwork and the strategic characteristics can further be enhanced. In addition, when the assigned object of an opponent is revealed, such a strategy as setting the cumulative value of the assigned object of that opponent equal to or lower than the threshold value, which leads to lower evaluation of the opponent, may be adopted. Accordingly, tactics toward the opponent may also be used and the strategic characteristics are enhanced.

According to a preferred sixth aspect of the present invention, any of the three or more types of arranged objects can be designated as an arranged object to be subjected to cumulative number update processing in accordance with the cumulative number update instructions.

According to the sixth aspect, each player can update the cumulative value of any arranged object among the three or more types of arranged objects. Accordingly, as the player should think about an arranged object of which cumulative value is to be updated depending on a situation in the game, the strategic characteristics are enhanced.

According to a preferred seventh aspect of the present invention, the game program further includes distribution instructions for distributing at least one increment/decrement object in which increment/decrement of the cumulative value of the arranged object is defined to each player. The cumulative number update instructions include instructions for accepting selection of at least one of the increment/decrement objects distributed to each player, instructions for accepting selection of at least one of the three or more types of arranged objects, and instructions for increasing or decreasing the cumulative value of the selected arranged object by a number defined in the selected increment/decrement object.

According to the seventh aspect, since each player should think about an operation in accordance with a situation out of options having two degrees of freedom, that is, which increment/decrement object is to be selected (that is, how many increment/decrement is to be indicated) and a cumulative value of which arranged object is to be changed, the strategic characteristics are enhanced.

According to a preferred eighth aspect of the present invention, the plurality of players make selection of the arranged object and the increment/decrement object in accordance with a prescribed order.

According to the eighth aspect) as each player alternately performs an operation for updating the cumulative value of the arranged object in accordance with the prescribed order, the player should think about various tactics taking into account an operation previously performed by another player. Therefore, the strategic characteristics are further enhanced.

According to a preferred ninth aspect of the present invention, the distribution instructions include increment/decrement object display instructions for displaying contents of the increment/decrement object distributed to each player in a manner identifiable by other players.

According to the ninth aspect, each player is required to use such tactics as estimating the assigned object set for an opponent, in view of the operation of the arranged object by a certain opponent as well as the increment/decrement object distributed to the opponent and a state of the cumulative value of the arranged object before the operation. Therefore, the play-against-type game having further strategic characteristics can be provided.

According to a preferred tenth aspect of the present invention, the distribution instructions include special object distribution instructions for distributing a special object defining contents of special processing for proceeding with the game in addition to the increment/decrement object to each player, and the increment/decrement object and the special object are displayed in a manner freely selectable by the player.

According to the tenth aspect, each player can selectively use the increment/decrement object and the special object depending on a situation. In particular, when the number of distributed special objects is limited, the player should think about optimal timing of using the special object, and the strategic characteristics are further enhanced.

According to a preferred eleventh aspect of the present invention, the assigned object setting instructions include assigned object display instructions for displaying, among the assigned objects set for respective players, only the assigned object set for the player himself/herself in an identifiable manner and displaying the assigned object set for another player in an unidentifiable manner.

According to the eleventh aspect, as each player cannot know the assigned object set for the opponent, the player should proceed with the game while guessing the assigned object set for the opponent based on the operation or the like by the opponent. Therefore, the play-against-type game having further strategic characteristics can be provided.

According to a preferred twelfth aspect of the present invention, the game program further includes assigned object type designation instructions for accepting designation of a type of the assigned object set for a specific player, and matching determination instructions for determining whether or not the designated type of the assigned object matches with the type of the assigned object set for the specific player. The evaluation instructions are adapted for evaluation also based on a result of determination obtained by executing the matching determination instructions.

According to the twelfth aspect, as each player can expect higher evaluation if he/she can correctly guess the assigned object set for the opponent based on the operation or the like by the opponent, the player attempts to guess the assigned object set for the opponent taking into account various factors. Therefore, the play-against-type game requiring more brainwork can be provided.

According to a preferred thirteenth aspect of the present invention, the evaluation instructions are adapted to evaluate the player who provided designation relatively higher than the specific player when it is determined that matching of the type of the object was achieved as a result of execution of the matching determination instructions.

According to the thirteenth aspect, as each player can obtain evaluation higher than the opponent by correctly guessing the type of the assigned object set for the opponent, the player attempts to guess the assigned object set for the opponent. In addition, as each player is disadvantageously evaluated if the opponent finds out the type of the assigned object set for the player himself/herself the player attempts to perform such an operation as preventing the opponent from estimating the object of the player himself/herself. Therefore, the play-against-type game requiring more brainwork can be provided.

According to a preferred fourteenth aspect of the present invention, the evaluation instructions are adapted to evaluate the specific player relatively higher than the player who provided designation when it is determined that matching of the type of the object was not achieved as a result of execution of the matching determination instructions.

According to the fourteenth aspect, when the opponent's estimation of the type of the assigned object set for each player is incorrect, the player can obtain evaluation higher than the opponent. Therefore, each player can also adopt such a strategy that the opponent is led to make incorrect estimation of the assigned object set for the player himself/herself. Therefore, the player can also be caused to use tactics toward the opponent and the strategic characteristics are enhanced.

According to a preferred fifteenth aspect of the present invention, the assigned object display instructions are adapted to vary a manner of display of the assigned object set for the specific player from a manner unidentifiable by other players to an identifiable manner when it is determined that matching of the type of the object was achieved as a result of execution of the matching determination instructions.

According to the fifteenth aspect, if any opponent finds out the type of the assigned object set for each player himself/herself, contents thereof will be known to all other players and each player will be placed in a disadvantageous situation from a point of view of obtaining higher evaluation. Therefore, various tactics to prevent the opponent from finding out the type of the assigned object of the player himself/herself are required, and the strategic characteristics are enhanced.

According to a preferred sixteenth aspect of the present invention, the game program further includes number-of-times detection instructions for detecting the number of times of acceptance of designation of the type of the assigned object set for the specific player, for each player, and disabling instructions for disabling acceptance of designation in accordance with the assigned object type designation instructions as to a user of which number of times of detection as a result of execution of the number-of-times detection instructions has attained to a prescribed number.

According to the sixteenth aspect, as each player is allowed to perform an operation for estimating the assigned object of the opponent in accordance with the assigned object type designation instructions only limited number of times, the player should think about optimal timing to perform the operation for estimating the assigned object, and deliberation is also required. Therefore, the strategic characteristics are further enhanced.

According to a seventeenth aspect of the present invention, a game device having features the same as those of the game program according to the first aspect of the present invention described above is provided.

According to an eighteenth aspect of the present invention, a game system providing a play-against-type game in which a plurality of players can participate is provided. The present game system includes: a first terminal device associated with a first player and including a first input portion and a first display; a second terminal device associated with a second player and including a second input portion and a second display; a cumulative number display unit for causing the first and second displays to display cumulative numbers of respective three or more types of arranged objects, an assigned object setting unit for setting, for each of at least first and second players, at least two types of arranged objects obtained by extracting a part of the three or more types of arranged objects as assigned objects of that player; a cumulative number update unit for updating the cumulative number of the arranged object of a designated type in accordance with an indication through at least one of the first and second input portions; a game end determination unit for determining whether a condition for end of the game is satisfied or not; and an evaluation unit for evaluating each player based on the respective cumulative numbers of at least two types of arranged objects set as the assigned objects for each player when it is determined that the condition for end of the game is satisfied.

According to the eighteenth aspect, a function and effect the same as with the game program according to the first aspect described above can be obtained.

According to a preferred nineteenth aspect of the present invention, the present game system further includes: a first assigned object display unit for causing the first display to display the assigned object set for the first player in an identifiable manner and to display the assigned object set for the second player in an unidentifiable manner; a second assigned object display unit for causing the second display to display the assigned object set for the second player in an identifiable manner and to display the assigned object set for the first player in an unidentifiable manner; an assigned object type designation unit for accepting, through the first input portion, designation of the type of the assigned object set for the second player, from the first player, and a matching determination unit for determining whether or not the designated type of the assigned object matches with the type of the assigned object set for the second player. The evaluation unit is configured to make evaluation also based on a result of determination by the matching determination unit.

According to the nineteenth aspect, a function and effect the same as with the game program according to the eleventh and twelfth aspects described above can be obtained.

According to a preferred twentieth aspect of the present invention, the plurality of players who participate in the play-against-type game, including the first and second players, sequentially provide an indication for updating the cumulative number of the arranged object in accordance with a prescribed order, until it is determined that the condition for end of the game is satisfied.

According to the twentieth aspect, a function and effect the same as with the game program according to the eighth aspect described above can be obtained.

In the description above, for better understanding of the present invention, supplemental explanation and the like are provided, however, they are not intended to limit the present invention in any manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing yet another example of a manner of playing the play-against-type game according to the embodiment of the present invention.

FIG. 15 is a diagram showing an output example (No. 3) on the display in the play-against-type game according to the embodiment of the present invention.

FIG. 18 is a diagram showing an output example (No. 6) on the display in the play-against-type game according to the embodiment of the present invention.

FIG. 19 is a diagram showing an output example (No. 7) on the display in the play-against-type game according to the embodiment of the present invention.

FIG. 22 is a schematic diagram showing a data sequence in connection with progress of the game according to the embodiment of the present invention.

DESCRIPTION OF TIM PREFERRED EMBODIMENTS

Figure 1:
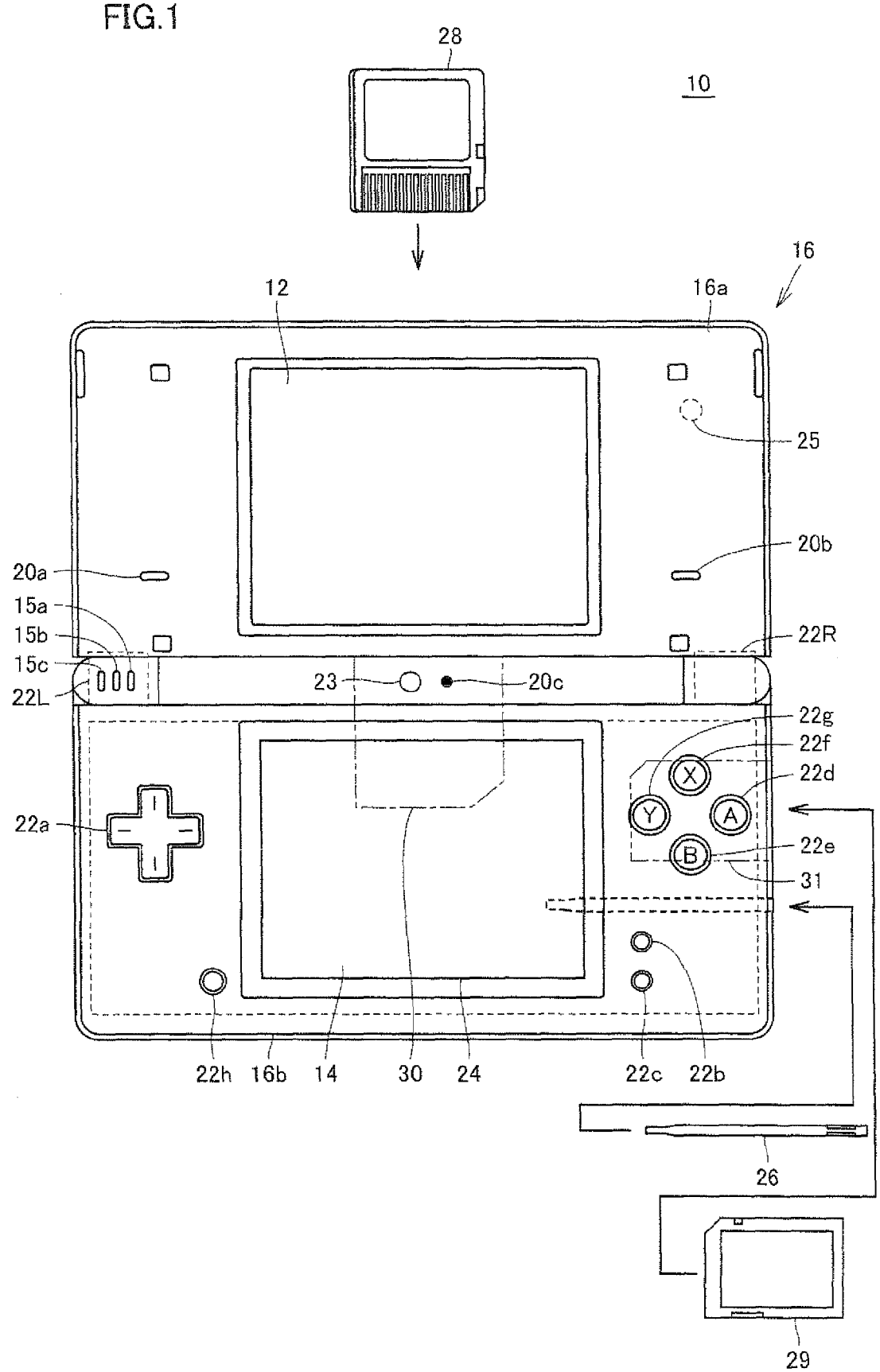
FIG. 1 is a schematic diagram showing appearance of a game device according to an embodiment of the present invention.

An embodiment of the present invention will be described in detail with reference to the drawings. The same or corresponding elements in the drawings have the same reference characters allotted, and description thereof will not be repeated.

A portable game device 10 will be described as a representative example of the game device according to the present invention. Game device 10 has input means (or an input portion) and display means (or a display). In addition, a program executed on game device 10 will be described as an example of the game program according to the present invention. It is noted that the game device according to the present invention is not limited to the portable game device, and a stationary game device may be applicable, or a general-purpose personal computer, a work station, a PDA (Personal Digital Assistant), a portable terminal such as a portable telephone, and the like, in which the game program according to the present invention has been installed, may also be applicable. Namely, an information processing device of any type adapted to processing by a processor may be employed. Here, the game program according to the present invention may be incorporated as a partial function of various applications executed on these information processing devices.

In addition, by connecting a plurality of controllers each having an input portion and a display to one game device or the like, a plurality of users can also use a common game device to play the play-against-type game according to the present invention.

In general, the game program according to the present invention is distributed as being stored in a storage medium that magnetically, optically or electronically stores information, such as a memory card, a cartridge or a DVD-ROM. Alternatively, such a scheme as directly or indirectly downloading the game program from a server on a network to a game device or the like may also be adopted.

Moreover, an environment for playing the present game may be provided by what is called an application service provider (ASP). Here, the server on the network performs processing for providing the present game and each user operates any terminal device incorporating a communication function to access the server. Further, what is called a cloud computing technique may be used to provide an environment for playing the present game by means of one server or a plurality of servers on the network.

<Terms>

A "player" herein refers to an entity having some intention, that participates in the play-against-type game according to the present invention. Namely, the "player" may be each user himself/herself who participates in the present game or a virtual user who issues an instruction in proceeding with the game in accordance with the game program executed on the game device.

<External Configuration of Game Device>

Referring to FIG. 1, game device 10 according to the embodiment of the present invention includes a first liquid crystal display (LCD; hereinafter also simply referred to as an "LCD") 12 and a second liquid crystal display (LCD) 14 serving as a display. LCD 12 and LCD 14 are accommodated in a housing 16 so as to satisfy prescribed positional relation. In the example shown in FIG. 1, housing 16 is constituted of an upper housing 16a and a lower housing 16b, LCD 12 is accommodated in upper housing 16a, while LCD 14 is accommodated in lower housing 16b. Therefore, LCD 12 and LCD 14 are arranged in proximity to each other, in a manner aligned in a vertical (up-down) direction.

Though an LCD is employed as the display in the present embodiment, an EL (Electronic Luminescence) display, a plasma display or the like may be employed instead of the LCD.

As shown in FIG. 1, upper housing 16a is slightly larger in a two-dimensional shape than LCD 12, and an opening is provided in one main surface so as to expose a display surface of LCD 12. On the other hand, a two-dimensional shape and a size of lower housing 16b are also designed similarly to upper housing 16a, and an opening is provided in a central portion in terms of a horizontal direction so as to expose a display surface of LCD 14.

Sound emission holes 20b and 20a corresponding to a right speaker 36a and a left speaker 36b (see FIG. 2) respectively are arranged in one main surface of upper housing 16a, on respective opposing sides of LCD 12. In addition, an outer camera 25 for picking up an image of a person, a landscape or the like viewed from the user is provided on the other main surface of upper housing 16a.

Upper housing 16a and lower housing 16b are pivotably coupled to each other, through a part of a lower side (lower end) of upper housing 16a and a part of an upper side (upper end) of lower housing 16b. For example, when game device 10 is not in use, upper housing 16a is folded by relatively pivoting the same such that the display surface of LCD 12 and the display surface of LCD 14 face each other. Then, damage such as flaw in the display surface of LCD 12 and the display surface of LCD 14 can be prevented. Instead of such a structure as pivotably coupling upper housing 16a and lower housing 16b to each other, housing 16 in which both of these are integrally arranged (in a fixed manner) may be employed.

A microphone hole 20c communicating with a microphone (not shown) and an inner camera 23 for picking up an image of the user or the like are provided in the center of the coupling portion of upper housing 16a and lower housing 16b. A game can also proceed based on audio data in accordance with voice and sound collected by this microphone. In addition, progress of a game based on data of an image picked up by inner camera 23, storage of the image data, or the like is also possible.

An operation switch 22 (22a, 22b, 22c, 22d, 22e, 22f, 22g, 22h, 22L, 22k) is provided in lower housing 16b. More specifically, operation switch 22 includes a direction indication switch (cross-shaped switch) 22a, a start switch 22b, a select switch 22c, an operation switch (A button) 22d, an operation switch (B button) 22e, an operation switch (X button) 22I, an operation switch (Y button) 22g, a power switch 22h, an operation switch (L button) 22L, and an operation switch (R button) 22R.

Direction indication switch 22a and power switch 22h are arranged on one main surface of lower housing 16b, on the left of LCD 14. Other switches 22b to 22g are arranged on that main surface of lower housing 16b, on the right of LCD 14. Operation switches 22L and 22R are arranged at a left corner portion and a right corner portion of an upper end surface of lower housing 16b, respectively. It is noted that, as operation switches 22L and 22R are arranged on a back surface of lower housing 16b and they are hidden behind the coupling portion when viewed from the front as shown in FIG. 1, they are shown with a dashed line.

Direction indication switch 22a functions as a digital joy stick. When one of four pressing portions is operated, an indication as to a direction of travel (or a direction of movement) of a player object (or a character object) operable in a game in progress is accepted. Alternatively, direction indication switch 22a accepts an indication as to a direction of movement or the like of a cursor. Alternatively, a specific role can also be assigned to each of the four pressing portions, and in this case, when any of the pressing portions is operated, the role corresponding to the operated pressing portion is indicated (designated).

Start switch 22b is implemented by a push button and accepts an indication for start (resume) or pause of the game. Select switch 22c is implemented by a push button and accepts an indication as to selection of a game mode or the like.

Operation switch 22d (A button) is implemented by a push button and it accepts an indication as to any action on a player object including hitting (punching), throwing, grasping (obtaining), riding, jumping, or the like. For example, in an action game, jumping, punching, actuating a weapon, or the like can be indicated by operating operation switch 22d. Alternatively, in a role-playing game (RPG) or simulation RPG, obtaining of an item, selection and determination of a weapon/a command, or the like can be indicated by operating operation switch 22d. In addition, operation switch 22e (B button) is implemented by a push button and accepts an indication as to change of a game mode selected with select switch 22c, an operation for canceling a previously determined action, or the like.

Operation switch 22f (X button) and operation switch 22g (Y button) are both implemented by a push button, and they are used for an auxiliary operation when operation switch 22d (A button) and operation switch 22e (B button) alone are not sufficient for proceeding with the game. It is noted that operation switch 22f (X button) and operation switch 22g (Y button) may be used for performing an operation the same as that with operation switch 22d (A button) and operation switch 22e (B button), or they may not be used at all.

Power switch 22h accepts an indication for turning ON/OFF power of game device 10. In addition, power switch 22h may be used for performing an operation to stop a program being executed in game device 10 and to return to a main menu.

Operation switch 22L (left push button) and operation switch 22R (right push button) are both implemented by a push button, and they accept an indication as to an operation the same as the operation assigned to operation switch 22d (A button) and operation switch 22e (B button) respectively. Alternatively, operation switch 22L (left push button) and operation switch 22R (right push button) may be used for an auxiliary operation independent of operation switch 22d (A button) and operation switch 22e (B button).

A touch panel 24 is provided on an upper surface of LCD 14. Touch panel 24 may be of any type such as a resistive film type, an optical type (infrared type), and a capacitive coupling type. Touch panel 24 is a pointing device for accepting an indication on any position (coordinate) on an LCD 14 screen from the user. When the user uses a stick (stylus pen) 26 or a finger (hereinafter also referred to as "stick 26 etc.") to press, pat or touch the upper surface of touch panel 24 (hereinafter also referred to as "touch operation"), touch panel 24 detects a coordinate of a position where a touch operation with stick 26 etc. was performed and outputs coordinate data corresponding to the detected coordinate.

In the present embodiment, it is assumed that the display surface of LCD 14 (and also LCD 12) has a resolution of 256 dots×192 dots. Therefore, detection accuracy of touch panel 24 is also set to 256 dots×192 dots in conformity with the display screen, however, detection accuracy of touch panel 24 may not necessarily be the same as that of a display screen.

Thus, game device 10 has LCD 12 and LCD 14 serving as a display of two screens and touch panel 24 is provided on an upper surface of any one of them (in the present embodiment, on LCD 14). Therefore, game device 10 is configured to have two display screens and two series of operation portions.

Though LCD 12 and LCD 14 are vertically aligned in the present embodiment, arrangement of two LCDs may be modified as appropriate. In another embodiment, LCD 12 and LCD 14 may be aligned in a horizontal direction. Though two LCDs are provided in the present embodiment, the number of LCDs serving as the display may be varied as appropriate. In another embodiment, two display areas may be defined in an up-down direction in a single, vertically long LCD so that two game screens are handled as independent display areas. Alternatively, two display areas are defined in a left-right direction in a single, horizontally long LCD so that two game screens are handled as independent display areas.

Stick 26 can be accommodated, for example, in an accommodation portion (shown with a dashed line in FIG. 1) provided in lower housing 16b and it is taken out as necessary.

An insertion opening 30 (shown with a chain dotted line in FIG. 1) for attaching a cartridge 28 is provided in the upper end surface of lower housing 16b. A connector 32 (see FIG. 2) for electrically connecting game device 10 and cartridge 28 to each other is provided within this insertion opening. A CPU (Central Processing Unit) 34 (see FIG. 2) of game device 10 can access cartridge 28 through connector 32.

In addition, an insertion opening 31 (shown with a chain double dotted line in FIG. 1) for attaching a memory card 29 is provided in a right end surface of lower housing 16b. A connector 33 (see FIG. 2) for electrically connecting game device 10 and memory card 29 to each other is provided within this insertion opening. CPU 34 (see FIG. 2) of game device 10 can access memory card 29 through connector 33.

Cartridge 28 and memory card 29 are common in storing data in a non-volatile manner. In principle, however, cartridge 28 is a device dedicated for game device 10, while memory card 29 is a general-purpose device. Typically, memory card 29 is implemented by an SD (Secure Digital) card or the like.

Though not shown in FIG. 1, a box for accommodating a battery for driving game device 10 is provided in a back surface of lower housing 16b. In addition, a jack for attaching a headphone or the like is provided in a lower end surface of lower housing 16b and a volume switch is provided in a left side surface thereof.

<Internal Configuration of Game Device>

Figure 2:
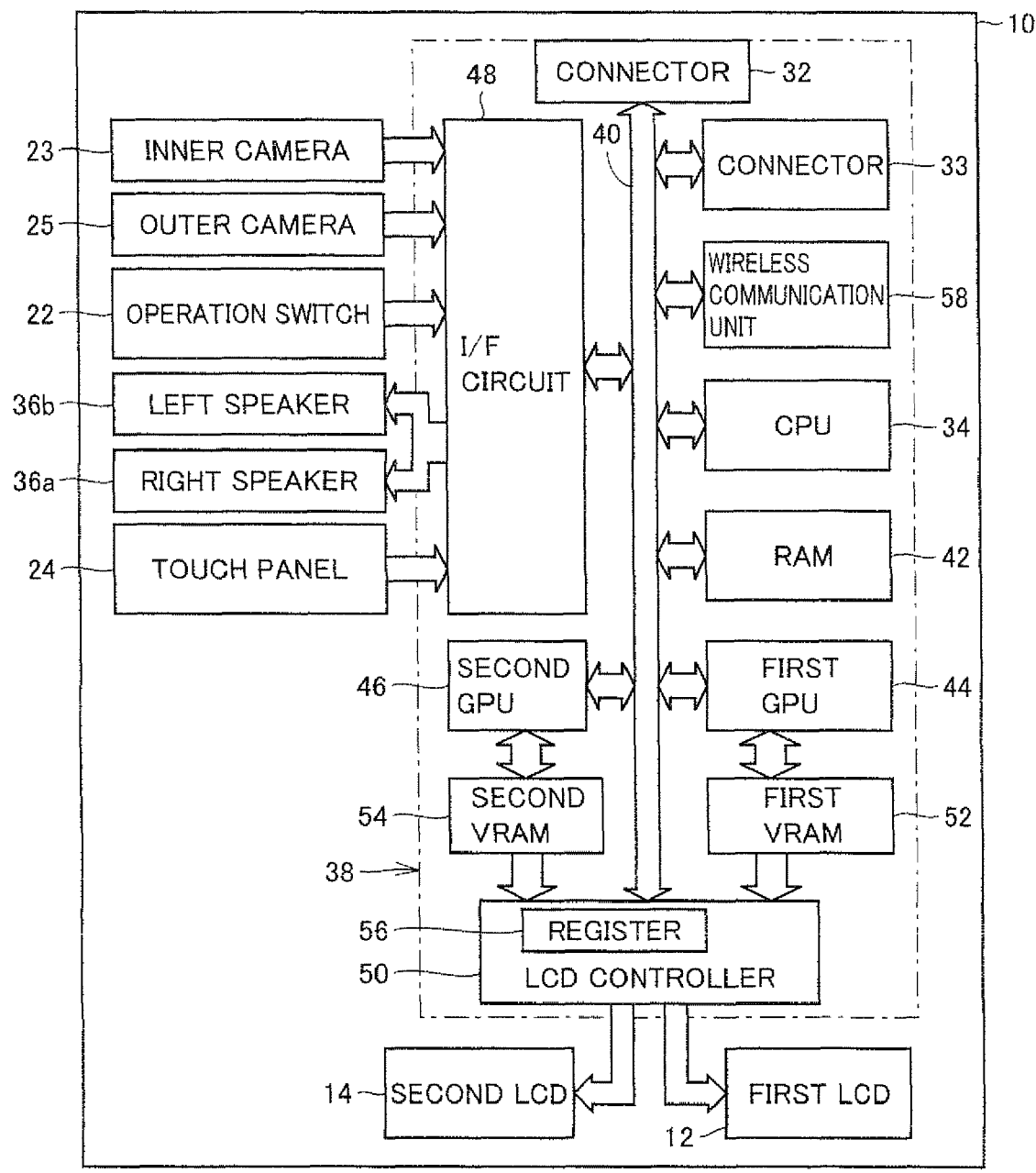
FIG. 2 is a block diagram showing an internal configuration of the game device according to the embodiment of the present invention.

Referring to FIG. 2, game device 10 according to the embodiment of the present invention includes an electronic circuit board 38 on which circuit components are mounted. More specifically, electronic circuit board 38 includes connectors 32 and 33, CPU 34, a RAM (Random Access Memory) 42, a first graphic processing unit (GPU; hereinafter also simply referred to as "GPU") 44, a second graphic processing unit (GPU) 46, an input and output interface circuit (hereinafter also simply referred to as an "I/F circuit") 48, an LCD controller 50, and a wireless communication unit 58. Each of these units is configured to be able to transmit data through a bus 40. In addition, electronic circuit board 38 includes a first video RAM (hereinafter also simply referred to as "VRAM") 52 and a second video RAM (VRAM) 54.

As described above, cartridge 28 is removably attached to connector 32. A configuration of cartridge 28 will be described later. In addition, as shown in FIG. 1, memory card 29 is removably attached to connector 33.

CPU 34 reads a program, image data, audio data, and the like from cartridge 28 connected to connector 32, memory card 29 connected to connector 33, a not-shown non-volatile memory embedded in game device 10, or the like, and loads it to RAM 42. Namely, RAM 42 is used as a buffer memory and/or a working memory. By executing the program loaded to RAM 42, CPU 34 provides a get and growth game or the like according to the present embodiment representing a typical example of information processing. In addition CPU 34 causes RAM 42 to temporarily store generated data (such as a character object, various types of data relating to the character object, flag data, or the like), as the game proceeds.

Each of GPU 44 and GPU 46 functions as a part of a rendering unit, and it is typically configured with a single chip ASIC (Application Specific Integrated Circuit). More specifically, each of CPU 44 and GPU 46 generates image data representing contents to be displayed on LCD 12 and LCD 14, in accordance with a graphics command (an image creation command) provided from CPU 34. It is noted that CPU 34 may provide an image generation program (included in a game program) necessary for generating image data to GPU 44 and GPU 46, in addition to the graphics command.

VRAM 52 is connected between GPU 44 and LCD controller 50, and VRAM 54 is connected between CPU 46 and LCD controller 50. Each of VRAM 52 and VRAM 54 is provided with an area for storing image data written by CPU 34 and an area for storing rendering data provided to LCD 12 or LCD 14 (rendering buffer). A frame buffer storing rendering data for one screen or a line buffer storing rendering data for one line may be adopted as the rendering buffer.

CPU 34 writes the image data necessary for rendering in prescribed areas of VRAM 52 and VRAM 54 through CPU 44 and CPU 46, respectively. GPU 44 accesses VRAM 52 to read the image data written by CPU 34, generates rendering data in accordance with the contents to be displayed on a corresponding LCD, and writes the rendering data in the rendering buffer of VRAM 52. Similarly, GPU 46 accesses VRAM 54 to read the image data written by CPU 34, generates rendering data in accordance with the contents to be displayed on a corresponding LCD, and writes the rendering data in the rendering buffer of VRAM 54.

LCD controller 50 selectively outputs the rendering data stored in the respective rendering buffers of VRAM 52 and VRAM 54 to LCD 12 and LCD 14. More specifically, LCD controller 50 includes a register 56 for storing data indicating connection relation between VRAM 52, VRAM 54 and LCD 12, LCD 14. Register 56 is configured, for example, to store a flag of 1 bit, and it is set to any of "0" and "1" in response to an indication from CPU 34. When a flag value of register 56 is set to "0", LCD controller 50 outputs the rendering data stored in VRAM 52 to LCD 12 and outputs the rendering data stored in VRAM 54 to LCD 14. On the other hand, when the flag value of register 56 is set to "1", LCD controller 50 outputs the rendering data stored in VRAM 52 to LCD 14 and outputs the rendering data stored in VRAM 54 to LCD 12. By thus changing the flag value of register 56 as appropriate, the contents displayed on LCD 12 and LCD 14 can be interchanged.

Though a configuration in which VRAM 52 and VRAM 54 are provided independently of RAM 42 has been illustrated in the present embodiment, a partial area of RAM 42 may be used as an area corresponding to VRAM 52 and VRAM 54.

Operation switch 22, touch panel 24, inner camera 23, outer camera 25, right speaker 36a, and left speaker 36b are connected to I/F circuit 48.

As described above, operation switch 22 includes switches 22a, 22b, 22c, 22d, 22e, 22t, 22g, 22L, and 22R. When any switch is operated, a corresponding operation signal (operation data) is provided to CPU 34 through I/F circuit 48. Similarly, touch panel 24 provides coordinate data detected in accordance with a user's touch operation to CPU 34 through I/F circuit 48. Inner camera 23 and outer camera 25 provide image data obtained as a result of image pick-up to CPU 34 through I/F circuit 48. Namely, operation switch 22 and touch panel 24 function as the input portion for accepting a user's operation.

In addition, CPU 34 provides audio data necessary for a game, such as a game music (BGM), sound effect, and utterance (onomatopoeia) of a character object to right speaker 36a and left speaker 36b through I/F circuit 48, as the game proceeds. Then, sound in accordance with the provided audio data is output from right speaker 36a and left speaker 36b. It is noted that right speaker 36a and left speaker 365 are hereinafter also simply referred to as "speaker 36".

Wireless communication unit 58 transmits and receives data to and from another game device 10 or communication equipment by radio. Game device 10 can be connected to a not-shown network through wireless communication unit 58, so that downloading of a program or data from a server on the network, uploading of the data to the server, communication with another game device 10 through the network, and the like can be carried out.

<Manner of Play>

An exemplary manner of playing the play-against-type game according to the embodiment of the present invention will be described with reference to FIGS. 3 to 6.

Figure 3:
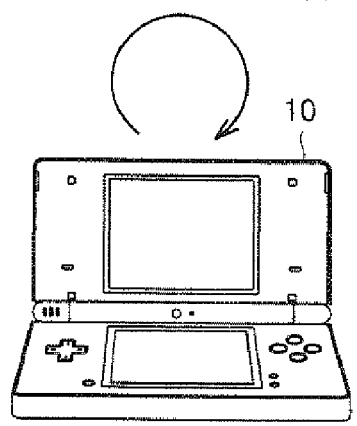
FIG. 3 is a diagram showing one example of a manner of playing a play-against-type game according to the embodiment of the present invention.

FIG. 3 shows a manner of one player playing the play-against-type game according to the present embodiment. Here, other players are virtually implemented in game device 10, and the game proceeds as the user operates game device 10. In other words, the user plays the present game against the computer.

Figure 4:
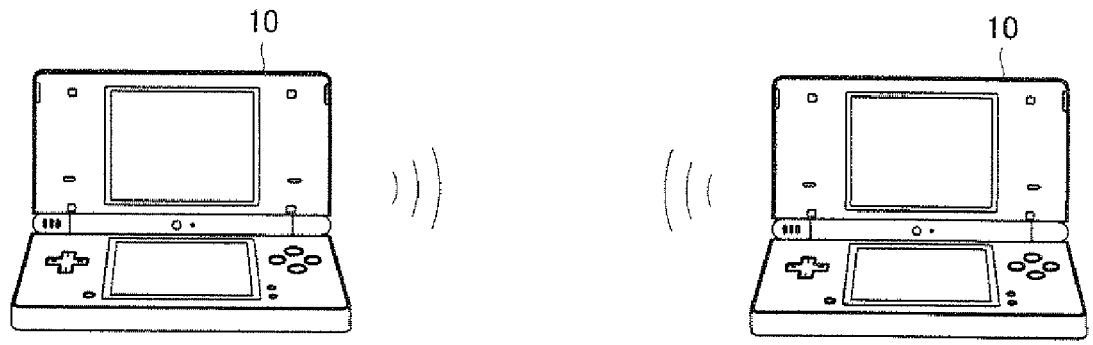
FIG. 4 is a diagram showing another example of a manner of playing the play-against-type game according to the embodiment of the present invention.

FIG. 4 shows a manner of two players playing the play-against-type game according to the present embodiment. Here, data is communicated between game devices 10 operated by respective users, so that data necessary for progress of the game is exchanged. It is noted that the play-against-type game according to the present embodiment can be played by two persons as will be described later and more players can also participate in the game. Therefore, when three or more players play the game, a player is virtually implemented in any game device 10 as described above. Alternatively, as shown in FIG. 5, more game devices 10 may be used so that a large number of users can also play the present game. Here, preferably, the game proceeds as a whole with specific game device 10 serving as the "master" and other game devices 10 serving as "slaves".

In the manner of play shown in FIG. 4 or 5, even when all game devices 10 do not hold the program according to the present embodiment, the program itself according to the present embodiment may be delivered (downloaded) from game device 10 serving as the "master" to other game devices 10.

Figure 6:
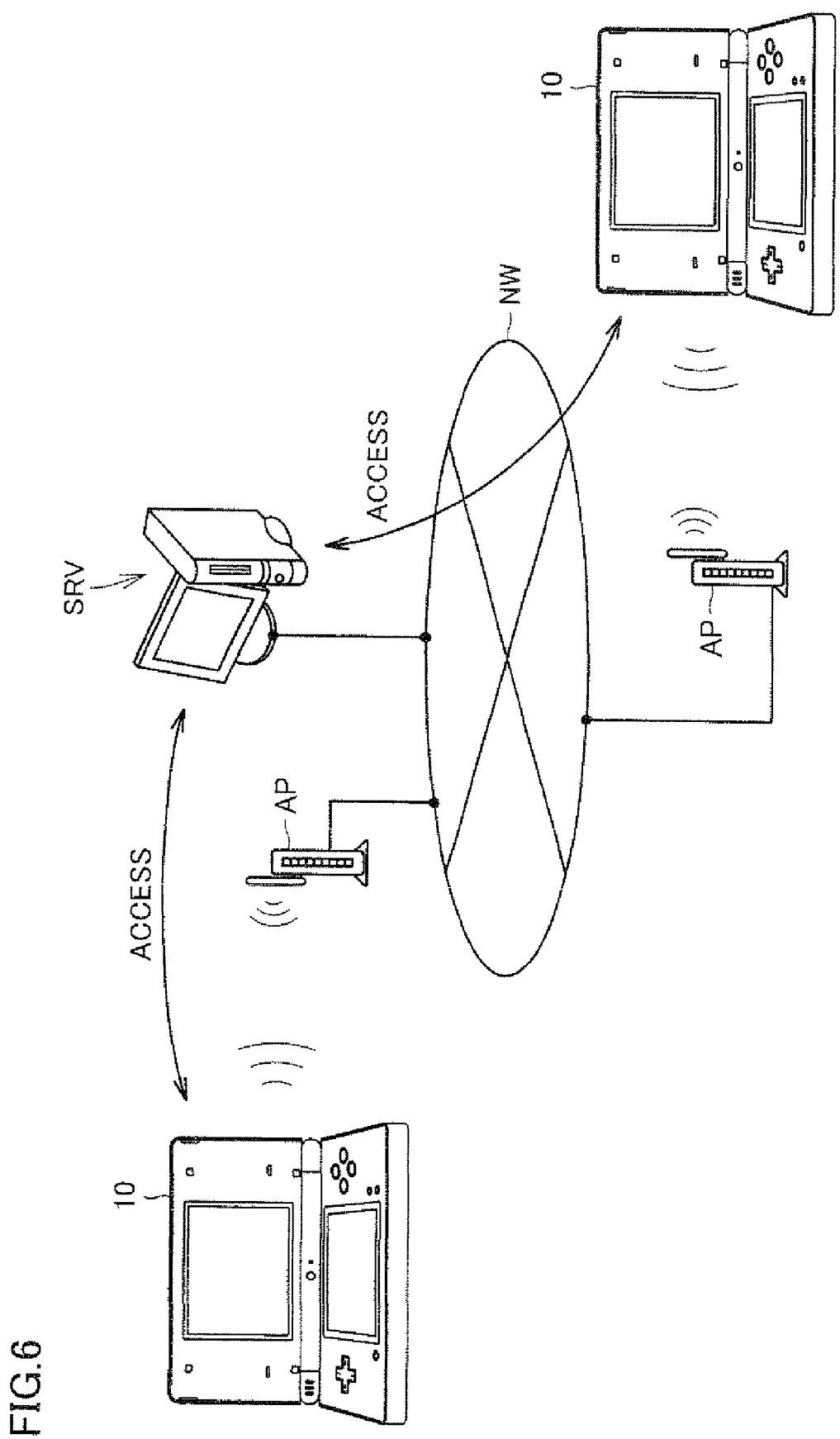
FIG. 6 is a diagram showing still another example of a manner of playing the play-against-type game according to the embodiment of the present invention.

In addition, as shown in FIG. 6, a user at a remote location can also play the present game through a network. Here, game device 10 operated by each user accesses a server SRV on a network NW through an access point AP mediating wireless communication to network NW. Then, on this server SRV, the game proceeds in accordance with data from each game device 10.

Moreover, the game program according to the present embodiment can also be delivered from server SRV to each game device 10 by means of a network configuration similar to that in FIG. 6.

Though FIGS. 4 to 6 illustrate a configuration in which data is exchanged between game devices 10 or between game device 10 and access point AP by radio, a wired system can naturally be employed.

<Overview of Play-Against-Type Game>

Figure 7:
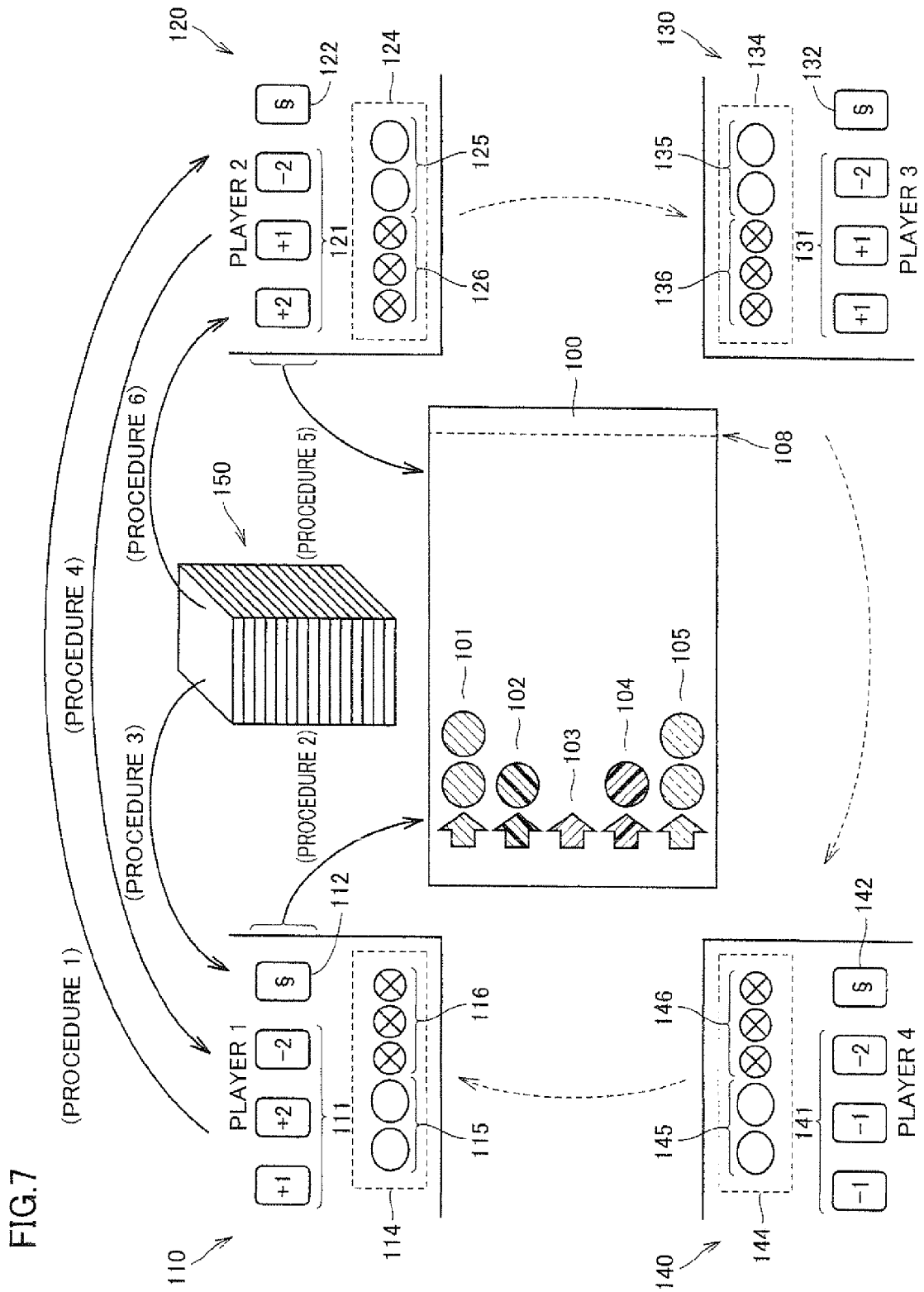
FIG. 7 is a schematic diagram for illustrating an overview of the play-against-type game according to the embodiment of the present invention.

FIG. 7 is a schematic diagram for illustrating an overview of the play-against-type game according to the embodiment of the present invention. Though FIG. 7 shows an example where there are four players, there may be any number of players equal to or greater than two.

(1) Field

Referring to FIG. 7, in the play-against-type game according to the present embodiment, a field 100 is virtually prepared. In this field 100, respective cumulative numbers of three or more types (though an example including five types are shown in FIG. 7, the embodiment is not limited to five types) of arranged objects (hereinafter also referred to as "pieces") are displayed. Namely, five types of pieces can cumulatively be arranged in field 100 in a horizontal direction of the sheet, and the number of pieces aligned in field 100 corresponds to the cumulative number. In the description below, for distinction between the types of the pieces, the piece is also denoted as a "first piece 101," a "second piece 102," a "third piece 103," a "fourth piece 104," and a "fifth piece 105." Though FIG. 7 shows an example where each piece is displayed in a manner different in hatching pattern for distinction between the types of the pieces, difference in the type may be expressed by displaying the pieces in different display color, shape, brightness, size, or the like.

In this field 100, the cumulative number of arranged object (piece) of a designated type is successively updated in response to an indication from each player. Namely, each player selects a number card distributed thereto in accordance with a prescribed order of play and selects a type of the piece on field 100, so as to increase or decrease the cumulative value of the selected type of the piece by the number defined in the selected number card. On the number card distributed to each player, such an indication as "+1" or "+2" for increasing the cumulative value or such an indication as "−1" or "−2" for decreasing the cumulative value is given. Five types of "+3", "+2", "+1" "−1", and "−2" are preferred as an increment or a decrement defined in the number card, however, an increment or a decrement such as "+4" or "+5" may be adopted.

The type of the number card distributed to each player is determined in accordance with a stock 150 randomly set at the time of start of the present game. More specifically, when the present game is started, a set of number cards in which a prescribed increment or decrement is defined is randomly numbered, and a prescribed number of number cards are distributed to each player in accordance with the number provided to each number card.

All players who participate in the game repeat an operation to increase or decrease the cumulative value of any type of the piece arranged on field 100 as described above, in accordance with the prescribed order of play. Namely, each player selects a number card or selects a piece on field 100, in the prescribed order.

In addition, when any player uses the number card for changing the cumulative value of the piece on field 100, a number card is sequentially added to the player from stock 150. It is noted that a unit of operation for changing the cumulative value of the piece on field 100 performed by each player is also referred to as a "turn".

From a point of view of increasing interest of the game, number cards in number greater than the maximum number of turns executable in one game are preferably prepared in stock 150. For example, assuming that each player is allowed to perform operations of 10 turns in one game, twenty number cards are necessary at the maximum for playing the game between two players. Here, a set of thirty number cards is prepared in stock 150. In other words, at least ten number cards located low in the set of thirty number cards prepared. In stock 150 are not distributed to any player. Alternatively, in playing the game among four players, forty number cards are necessary at the maximum and a set of sixty number cards is prepared in stock 150.

Therefore, since only a part of the set of number cards prepared in advance is distributed to the players the number cards distributed to each player are varied and the game can be more interesting.

In game device 10, contents of the number cards distributed to respective players as described above are held as player information 110, 120, 130, and 140 brought in correspondence with respective players that participate in the game. Namely, player information 110, 120, 130, and 140 includes number card information 111, 112, 131, and 141, respectively. As the contents of player information 110, 120, 130, and 140 are provided to all players that participate in the present game, the contents of the number card distributed to each player are displayed in a manner identifiable by other players.

Thereafter, when the cumulative number of at least one type of piece on field 100 has attained to a prescribed number and/or when the number of times of update of the cumulative value of the piece on field 100 has attained to a prescribed number, the present game ends. Namely, when any type of piece cumulatively arranged on field 100 reaches an end line 108 and/or when the prescribed number of turns of each player is completed, determination as the end of the game is made.

The case where the cumulative number of at least one type of piece on field 100 has attained to the prescribed number (for example, "10") described above includes, for example, a case where the cumulative numbers of two types of pieces have both attained to the prescribed number. As a plurality of types of indications for increasing or decreasing the cumulative value are defined in the number cards, the cumulative value after change in accordance with the number card may not exactly match with the prescribed number set as a condition for end of the game. For example, when any player selects a certain piece of which cumulative value has attained to "8" and uses the number card in which "+3" is defined, the cumulative value is changed to "11" exceeding "10" which is the prescribed number, however, this case may also be regarded as "the cumulative number attaining to the prescribed number" and determination as the end of the game may be made.

Alternatively, determination as the end of the game may be made only when the cumulative value of at least one type of piece on field 100 matches with the prescribed value. Here, when the cumulative value of a certain piece after change exceeds the prescribed value as a result of selection of a number card by the player, the cumulative number may be decreased by that excess. For example, when any player selects a certain piece of which cumulative value has attained to "8" and uses the number card in which "+3" is defined, the cumulative value should basically be changed from "8" to "11", however, it is changed to "9" because "11" comparable to the excess over "10" is subtracted.

(2) Arrangement of Piece and Evaluation Processing (No. 1)

In the play-against-type game according to the present embodiment, at least two types of pieces obtained by random extraction from the types of prepared pieces are set in advance for each player as the assigned pieces (assigned objects) of that player. In the description below, a case where two types of pieces are set as assigned pieces for each player is shown as a typical example.

When the game ends as the condition as described above is satisfied, an evaluation value for each player is calculated based on the cumulative value at that time point of the assigned piece set for the player. Namely, the assigned piece defines the type of the piece to be evaluated for each player. More specifically, an evaluation point is calculated, depending on a difference between the cumulative value of one assigned piece and the cumulative value of the other assigned piece. That is, as the difference between the cumulative value of one assigned piece and the cumulative value of the other assigned piece is greater, a higher evaluation value is calculated. Typically, the difference (absolute value) in the cumulative value between the assigned pieces is calculated as the evaluation value.

In addition, in calculating the evaluation point for each player, when at least a part of cumulative values of the assigned pieces set for the player is equal to or lower than a prescribed threshold value, a corresponding evaluation value is preferably set to a minimum value. Typically, the threshold value at the time of end of the game is set to "0". In the present embodiment, as a concept of a negative number is not adopted, whether the cumulative value of any assigned piece of each player is either "0", or "1" or more is determined. When the cumulative value of any assigned piece of each player is "0", the evaluation value is assumed as "0". By adopting such calculation rules, each player should select a number card and a type of the piece such that the cumulative values of all respective assigned pieces set for the player himself/herself are greater than "0" by the end of the game and should select a number card and a type of the piece such that the difference in the cumulative value between the assigned pieces is greater. Thus, each player should consider such a strategy as satisfying conditions inconsistent in a certain aspect, and a play-against-type game with enhanced strategic characteristics can be provided.

Here, at the time of start of the game, only pieces set for each player himself/herself among the assigned pieces set for respective players are displayed in an identifiable manner, and assigned pieces set for other players are displayed in an unidentifiable manner.

Therefore, except for a case where judgment processing which will be described later is performed, each player cannot know the assigned pieces set for other players. Accordingly, each player can have fun while estimating the assigned pieces set for other players based on a move or the like of other players and thinking various strategies.

Instead of a method of calculating the evaluation point as described above, the sum of cumulative values of the assigned pieces may be employed as the evaluation value, or the product of cumulative values may be employed as the evaluation value. In addition, when three or more types of pieces are set as the assigned pieces of each player, the total of differences in all kinds of combination of the cumulative values of the assigned pieces may be calculated as the evaluation value, the difference between the maximum value and the minimum value of the cumulative values of the assigned pieces may be calculated as the evaluation value the difference between top two cumulative values of the assigned pieces may be calculated as the evaluation value, and the difference between bottom two cumulative values of the assigned pieces may be calculated as the evaluation value.

(3) Judgment Processing and Evaluation Processing (No. 2)

Though the assigned pieces set for other players are displayed in an unidentifiable manner at the time of start of the game, each player selects a number card and a type of the piece such that the difference in the cumulative value between the assigned pieces set for the player himself/herself is greater as described above. Therefore, in some cases, other players can estimate which type of piece is set as the assigned piece of that the player.

Then, in the play-against-type game according to the present embodiment, each player can estimate the type of the assigned piece set for other players. When a certain player estimates the type of the assigned piece set for a specific player, whether or not the estimated type of the assigned piece matches with the type of the assigned piece set for the designated specific player is determined. The evaluation value of the player is calculated also based on this result of determination (based on match or unlatch). Such processing for estimation of a type of assigned piece set for other players by a certain player is also referred to as "judgment processing".

More specifically, player information 110, 120, 130, and 140 includes judgment information 114, 124, 134, and 144, respectively. Judgment information includes success information 115 indicating information that judgment processing as to player 1 by other players was successful and failure information 116 indicating information that judgment processing as to player 1 by other players has failed. Namely, success information 115 stores the type of the assigned piece turned out to have been set for player 1 as a result of judgment processing by other players. In addition, failure information 116 stores the type of the assigned piece turned out not to have been set for player 1 as a result of judgment processing by other players. This is also applicable to other judgment information 124, 134 and 144. Contents of judgment information 114, 124, 134, and 144 are displayed in a manner identifiable by other players.

Namely, for example, success information 115 included in player information 110 representing player 1 stores the type of the assigned piece of player 1 and it is displayed in a manner identifiable only by player 1 himself/herself. In addition, failure information 116 included in player information 110 representing player 1 stores the type of the assigned piece turned out not to have been set for player 1 as a result of judgment processing by other players (player 2 to player 4).

Though the number of areas for storing success information 115 and failure information 116 is set to two and three for one player in FIG. 7 respectively, this number can be set as appropriate in accordance with the number of assigned pieces and the number of permitted times of failure in judgment as to one player (hereinafter also referred to as "the number of permitted failures"). In addition, though FIG. 7 illustrates failure information 116 having three storage areas, in an example where two players play against each other, the number of permitted failures is set to two, and hence the third storage area for failure information 116 is not used.

In this judgment processing, when the type of the assigned piece of another player estimated by a certain player matches with the actually set type of the assigned piece of another player, the player who made that estimation is evaluated relatively higher than another player for whom estimation was made. More specifically, a judgment bonus owing to success in the judgment processing is added to the evaluation value of the player who made that estimation. Alternatively, a penalty point owing to correct estimation of the type of the assigned piece is subtracted from the evaluation value of another player for whom estimation was made.

On the other hand, in the judgment processing, when the type of the assigned piece of another player estimated by a certain player did not match with the actually set type of the assigned piece of another player, another player for whom estimation was made is evaluated relatively higher than the player who made that estimation. More specifically, a fake bonus owing to failure in the judgment processing is added to the evaluation value of another player for whom estimation was made. Alternatively, a penalty point owing to failure in estimation of the type of the assigned piece is subtracted from the evaluation value of the player who made that estimation.

It is noted that such a result of the judgment processing is displayed in a manner identifiable by all other users. Namely, when the type of the assigned piece of another player estimated by a certain player matches with the actually set type of the assigned piece of another player, a manner of display of the assigned piece set for another player for whom estimation was made is varied from a manner unidentifiable by other players to an identifiable manner. Alternatively, when the type of the assigned piece of another player estimated by a certain player did not match with the actually set type of the assigned piece of another player, the fact that the designated assigned piece is not set for another player for whom estimation was made is displayed in an identifiable manner.

In addition, the number of times of judgment processing allowed for each player is restricted to a prescribed number (for example, two). Namely, the number of times of execution of the judgment processing is summed and managed for each player, and the judgment processing is disabled for a user whose summed number of times of execution or judgment has attained to the prescribed number.

(4) Trick Card

In the play-against-type game according to the present embodiment, a trick card, which is a special object in which contents of special processing for proceeding with the game are defined, is distributed to each player, in addition to one or more number card. Therefore, each player can arbitrarily select a card considered as necessary in accordance with a situation of the game in progress, from among the distributed number cards and trick card.

More specifically, player information 110, 120, 130, and 140 includes trick card information 112, 122, 132, and 142, respectively.

As will be described below, a plurality of types of such trick cards are preferably prepared. Here, each player may be allowed to select a trick card of a type considered as necessary, or a trick card randomly selected from among a plurality of types of trick cards may be distributed to each player. In an example where each player can arbitrarily select a trick card, the type of a selectable trick card may be varied in accordance with a situation of the game in progress. For example, as the number of wins in the past, the number of consecutive wins, or the like of each player is greater, selection from among more types of trick cards may be allowed.

Examples of special processing defined in the trick card as described above include the following:

Increase by one the sum value for all pieces on field 100;

Decrease by one the sum value for all pieces on field 100;

Change of the type of the assigned piece set for the player himself/herself;

Update the sum value of a plurality of pieces on field 100, with one number card;

Hide operation details on the piece(s) on field 100 from other players, until a prescribed number of turns are performed; and Reverse the sign of an increment/decrement defined in the number cards distributed to all players.

(5) Overall Progress

When the start of the play-against-type game according to the present embodiment is indicated, initial processing such as (a) determination of the order of play, (b) setting of assigned pieces for each player, (c) initial setting of field 100, (d) setting of sequence in the stock, (e) distribution of number cards to each player, and (f) distribution of a trick card to each player is performed. More specific processing contents in (c) initial setting of field 100 are such that an initial value of the cumulative value of each piece in field 100 is randomly determined. Typically, the initial value for randomly selected two types of pieces is set to "2", the initial value for two types of pieces randomly selected from among remaining types is set to "1", and the initial value for the remaining types of pieces is set to "0".

When such initial setting is completed, operations are repeated in accordance with a prescribed order of play among the players who participate in the game, until the condition for end of the game is satisfied. For example, assuming that the game is played in the order of player 1→player 2→player 3→player 4, the play right is sequentially allocated to each player in this order.

Initially, when the play right is allocated to player 1, inquiry about whether to perform judgment processing or not is issued to player 1. Here, when player 1 selects execution of the judgment processing, the judgment processing is performed (procedure 1). After the judgment processing is completed, player 1 is urged to perform an operation for increasing or decreasing the cumulative value of the piece on field 100. Here, player 1 designates a number card distributed to player 1 while viewing the type of the assigned piece set in advance and/or a situation on field 100, and designates the type of the piece of which cumulative value is to be changed (procedure 2). This operation updates the cumulative value of the piece on field 100. When player 1 uses the number card, a number card is additionally supplied to player 1 from stock 110 (if there are distributable number cards remaining in stock 150) (procedure 3). Thereafter, the play right moves from player 1 to player 2. Namely, the turn of player 1 ends.

When the play right moves to player 2, processing the same as the processing by player 1 is performed. Namely, initially, inquiry about whether to perform the judgment processing or not is issued to player 2. Here, when player 2 selects execution of the judgment processing, the judgment processing is performed (procedure 4). After the judgment processing is completed, player 2 is urged to perform an operation for increasing or decreasing the cumulative value of the piece on field 100. Here, player 2 designates a number card distributed to player 2 while viewing the type of the assigned piece set in advance and/or a situation on field 100, and designates the type of the piece of which cumulative value is to be changed (procedure 5). This operation updates the cumulative value of the piece on field 100. When player 2 uses the number card, a number card is additionally supplied to player 2 from stock 150 (if there are distributable number cards remaining in stock 150) (procedure 6). Thereafter, the play right moves from player 2 to player 3. Namely, the turn of player 2 ends.

Thereafter, similarly, the play right sequentially moves to player 3 and player 4, and when a series of processing is completed, the processing is again repeated in a similar order. Such processing is repeatedly performed until the condition for end of the game is satisfied.

When it is determined that the condition for end of the game is satisfied, the present game ends, the evaluation value for each player is calculated, and a winner among the players is determined.

When the present game ends as the cumulative number of at least one type of piece on field 100 attains to the prescribed number, a goal bonus may be added to the evaluation value of the player who successfully had the piece reach end line 108.

In addition, when the number of times of executed judgment processing by any player has not attained to the prescribed number after the condition for end of the game is satisfied, an extra turn for performing only judgment processing that has not yet been performed may be performed.

<Control Structure>

Figure 8:
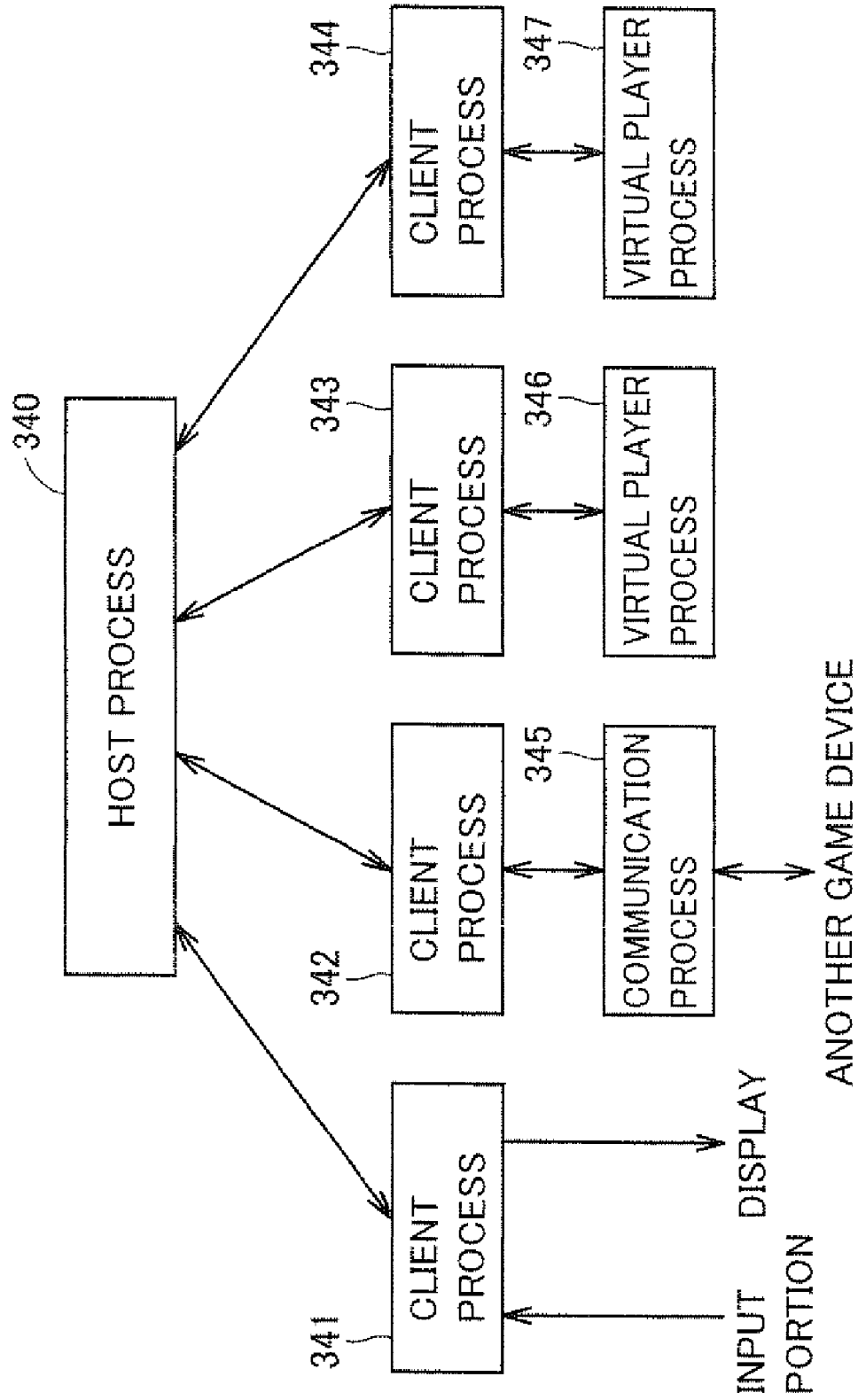
FIG. 8 is a schematic diagram showing a control structure implemented by a CPU of the game device according to the embodiment of the present invention.

FIG. 8 is a schematic diagram showing a control structure implemented by CPU 34 of game device 10 according to the embodiment of the present invention. In FIG. 8, it is assumed that player 1 is the user who operates game device 10, player 2 is the user who operates another game device 10, and player 3 and player 4 are virtual users implemented by the game program.

Referring to FIG. 8, as a basic control structure, CPU 34 of game device 10 according to the present embodiment performs a host process 340 responsible for processing for proceeding with the present game and client processes 341, 342, 343, and 344 responsible for processing for respective players who participate in the present game. More specifically, in host process 340, the initial processing described above is performed, and then the play right is sequentially allocated to client processes 341, 342, 343, and 344 and the game proceeds in accordance with an indication from the client process having the play right.

In client process 341, in response to an indication from the user through the input portion (operation switch 22 and touch panel 24) of game device 10 in which host process 340 is performed, a command is generated to host process 340 and a result of processing by host process 340 is output to the display (first LCD 12 and second LCD 14).

In addition, CPU 34 performs a communication process 345 and virtual player processes 346 and 347. In client process 342, communication process 345 is used to receive an indication from the user who operates another game device 10, and a command is generated to host process 340 and the result of processing in host process 340 is transmitted to another game device 10. In addition, in client processes 343 and 344, in response to indications from virtual player processes 346 and 347 respectively, commands are generated to host process 340. Typically, client processes 343 and 344 are implemented as a program utilizing AI (artificial intelligence).

It is noted that only a necessary number of client processes is started up, in accordance with the number of players who participate in the present game. In addition, in an example where other players who participate in the present game are all users operating other game devices 10, the virtual player process as shown in FIG. 8 is not started up but communication processes in number corresponding to the number of communication target game devices 10 are started up.

A processing procedure described below is mainly included in the processing in host process 340.

<Processing Procedure and User Interface Example>

Figure 9:
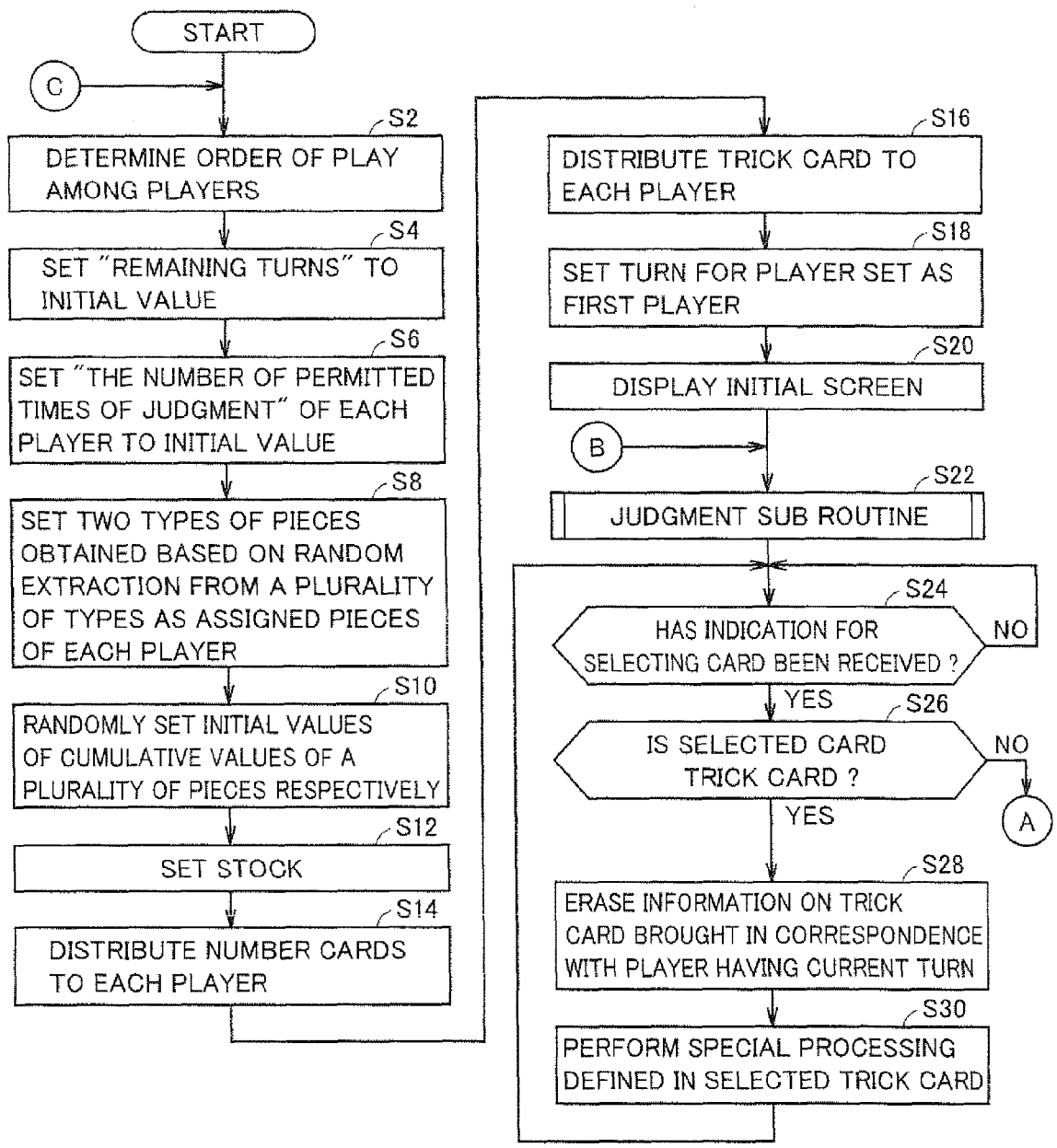
FIGS. 9 to 12 are flowcharts showing an overall processing procedure for proceeding with the play-against-type game according to the embodiment of the present invention.
Figure 10:
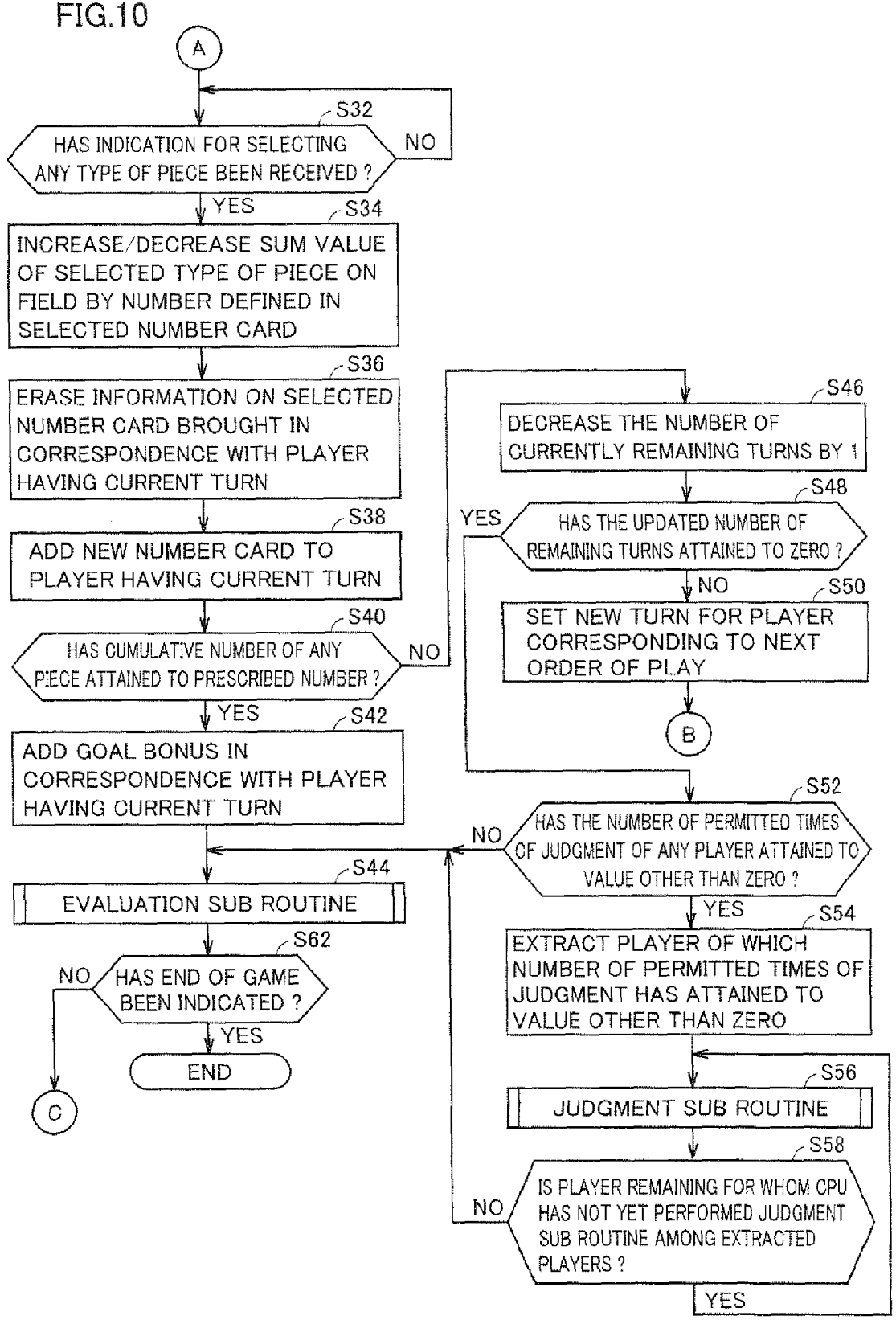
Figure 11:
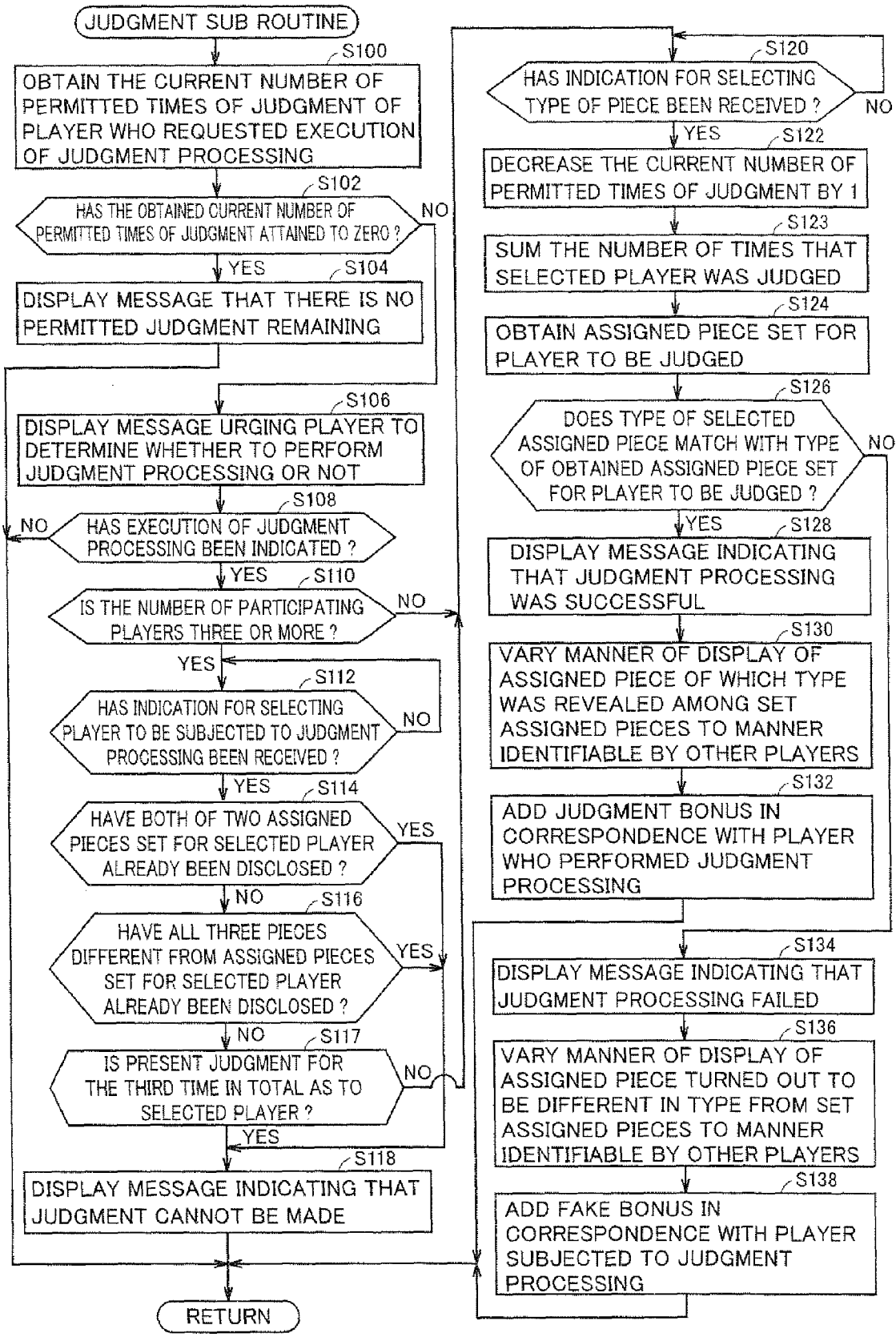
Figure 12:
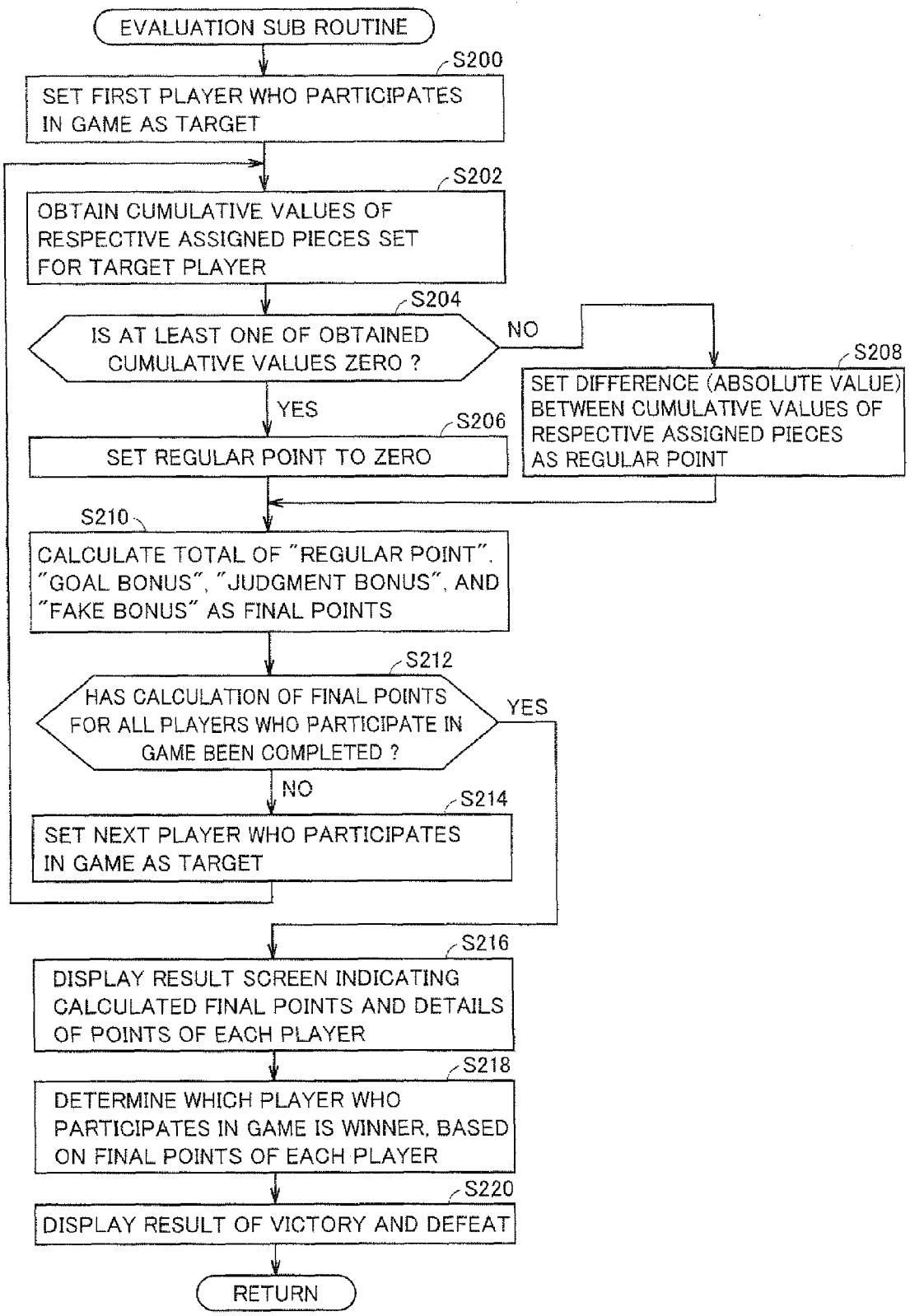

FIGS. 9 and 10 are flowcharts showing an overall processing procedure for proceeding with the play-against-type game according to the embodiment of the present invention. FIG. 11 is a flowchart showing a processing procedure in a judgment sub routine according to the embodiment of the present invention. FIG. 12 is a flowchart showing an evaluation sub routine according to the embodiment of the present invention. Each step shown in FIGS. 9 to 12 is provided by execution of the game program according to the present embodiment by CPU 34 of game device 10.

Referring to FIGS. 9 and 10, initially, the user performs a prescribed operation on game device 10, so as to start proceeding with the play-against-type game according to the present embodiment. When the user selects a manner of play in which the present game proceeds while exchanging data among a plurality of game devices 10 as shown in FIGS. 4 to 6, processing for inviting participants in the present game is performed.

In addition, in the present game, an arbitrary character can be selected as a player from among a plurality of characters, and CPU 34 sets a designated character or a randomly determined character for each player who participates in the present game.

When progress of the game is started, initially, CPU 34 determines the order of play among the players who participate in the game (step S2). In succession, CPU 34 sets "remaining turns" used for determination of the condition for end of the game to an initial value (step S4) and sets "the number of permitted times of judgment" indicating the number of permitted times of judgment processing of each participating player to an initial value (step S6). In step S4, the initial value of the "remaining turns" is preferably set to approximately 10 turns for each participating user. Namely, when four players participate in the game, "40 turns" is set as the initial value of the "remaining turns". In addition, the "the number of permitted times of judgment" is preferably set to approximately "two" for each player.

In succession, CPU 34 sets, for each player, two types of pieces obtained by random extraction from the plurality of prepared types as the assigned pieces of that player (step S9). Namely, CPU 34 functions as an assigned object setting unit for setting, for each player, at least two types of pieces obtained by extraction of a part of three or more types of pieces (arranged objects) as the assigned pieces (assigned objects) of that player.

In addition, CPU 34 randomly sets initial values of the cumulative values of a plurality of prepared pieces respectively (step S10), sets the stock by randomly numbering a set of number cards in which a predetermined increment/decrement is defined (step S12), distributes number cards to each player in accordance with the set stock (step S14), and distributes a trick card to each player (step S16). Namely, CPU 34 functions as a distribution unit for distributing to each player at least one number card (increment/decrement object) in which increment/decrement in the cumulative value of the piece (arranged object) on field 100 is defined, and functions as a special object distribution unit for distributing to each player a trick card (special object) in which contents of special processing for proceeding with the game in addition to the number card (increment/decrement object).

When the initial processing as described above is completed, CPU 34 sets a turn for the player set as the first in the order of play (step S18). Then, CPU 34 causes a display of game device 10 itself (first LCD 12 and/or second LCD 14) and a display of one or more game device 10 (as necessary) to display an initial screen in connection with the present game (step S20).

Figure 13:
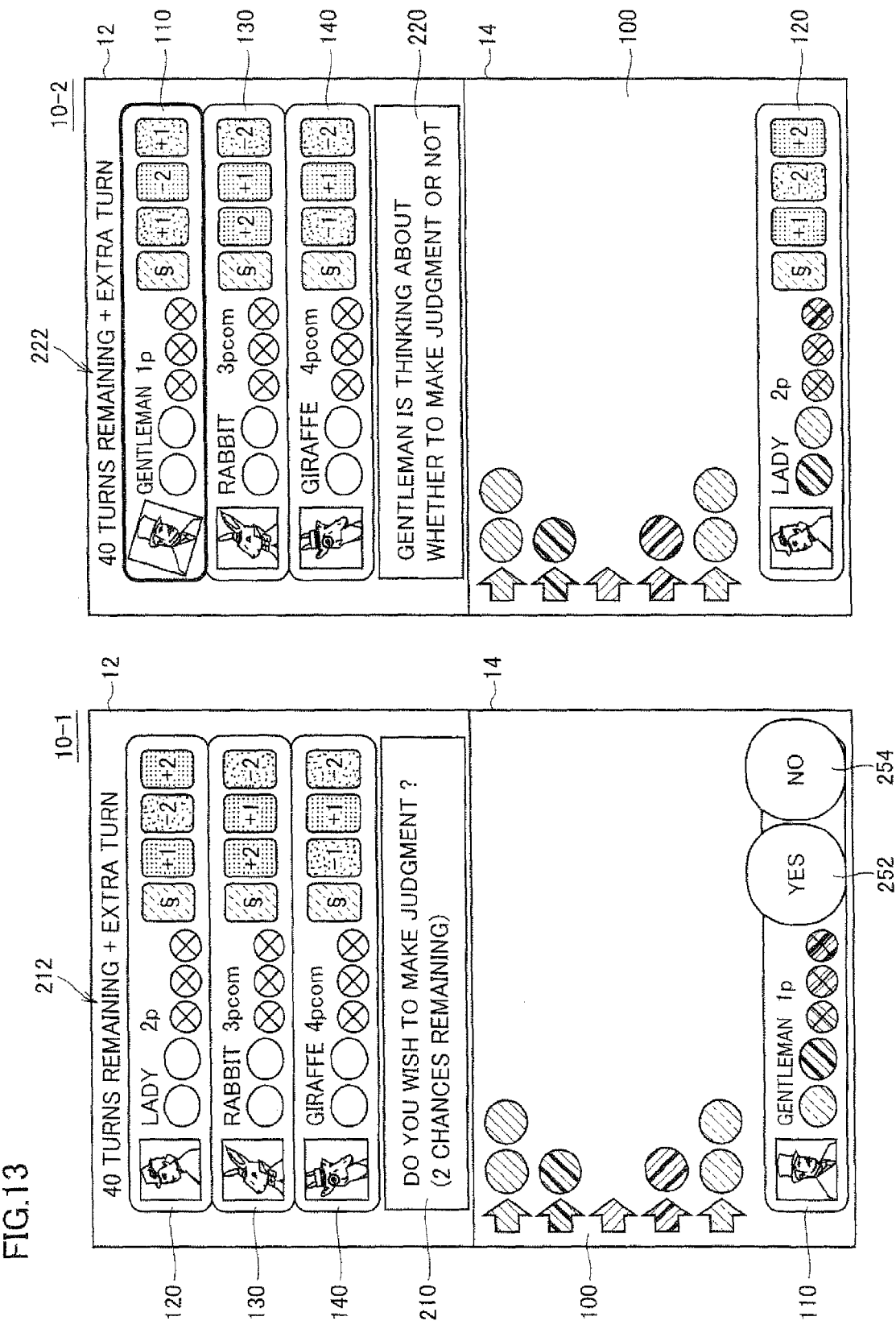
FIG. 13 is a diagram showing an output example (No. 1) on a display in the play-against-type game according to the embodiment of the present invention.

FIG. 13 shows an exemplary initial screen displayed in step S20. More specifically. FIG. 13 shows exemplary initial screens displayed on a game device 10-1 operated by the user who participates in the game as player 1 and a game device 10-2 operated by the user who participates in the game as player 2 respectively. For the sake of convenience of illustration, FIG. 13 shows entire images (screen shot) displayed on first LCD 12 and second LCD 14 of game devices 10-1 and 10-2 together in a vertically aligned manner, and this is also the same in FIGS. 14 to 21 below.

As shown in FIG. 13, in the initial screen for player 1 displayed on game device 10-1, on second LCD 14 located on a lower side of the sheet, a state of arrangement of the pieces on field 100 is visually displayed and player information 110 on player 1 is displayed. In addition, on first LCD 12 located on an upper side of the sheet, player information 120, 130 and 140 on other respective players 2, 3 and 4 who participate in the present game is displayed and an indicator 210 for providing notification of various messages relating to progress of the game is displayed. Moreover, a text 212 indicating the number of remaining turns representing one of the conditions for ending the present game is also displayed on first LCD 12.

In the initial screen for player 2 displayed on lame device 10-2 as well, on second LCD 14 located on the lower side of the sheet, a state of arrangement of the pieces on field 100 is visually displayed. Player information 120 on player 2 is displayed on second LCD 14. Moreover, on first LCD 12 located on the upper side of the sheet, player information 110, 130 and 140 on other respective players 1, 3 and 4 who participate in the present game is displayed and an indicator 220 for providing notification of various messages relating to progress of the game is displayed. Further, a text 222 indicating the number of remaining turns representing one of the conditions for ending the present game is also displayed on first LCD 12.

As shown in FIG. 13, CPU 34 functions as a cumulative number display unit for displaying the respective cumulative numbers of the three or more types of pieces (arranged objects). In addition, as illustrated as player information 110, 120, 130, and 140, CPU 34 functions as an increment/decrement object display unit for displaying contents of the number cards distributed to each player in a manner identifiable by other players.

In addition, as can clearly been seen from player information 110 in the initial screen for player 1 displayed on game device 10-1 and player information 120 in the initial screen for player 2 displayed on game device 10-2, among the assigned pieces set for each player, only the types of the assigned pieces set for the player himself/herself are displayed in an identifiable manner, and the types of the assigned pieces set for one or more player are displayed in an unidentifiable manner.

Referring back to FIGS. 9 and 10, CPU 34 performs a judgment sub routine (step S22). This judgment sub routine is a sub routine for performing the judgment processing described above. Details of the judgment sub routine will be described later with reference to FIGS. 11, 13 to 16, 17A, and 17B.

After the judgment sub routine is performed, CPU 34 determines whether or not an indication for selecting any card has been received from the player having the current turn (step S24). As described above, CPU 34 receives any of an indication through the input portion from the user operating the game device itself, an indication from the user operating another game device 10, and an indication from the virtual player provided by execution of the program in the game device itself, depending on the manner of play by the user. This processing is the same also for other indications shown below.

When the indication for selecting a card has not been received from the player having the current turn (NO in step S24), the processing in step S24 is repeated. On the other hand, when the indication for selecting a card has been received from the player having the current turn (YES in step S24), CPU 34 determines whether the selected card is a trick card or not (step S26).

FIGS. 18 and 19 show exemplary operation screens displayed in steps S26 to S38. On the operation screen shown in FIGS. 18 and 19, a plurality of cards (in this example, three number cards of "+1", "−2" and "+1" and one trick card showing "§") are displayed together in player information 110, and the user selects a card through touching with stick etc. 26. Namely, the number card (increment/decrement object) and the trick card (special object) are displayed such that any of them can arbitrarily be selected by the player.

In addition, on game devices 10-1 and 10-2, a message that "it is gentleman's turn" indicating that player 1 has the current turn is shown in indicators 210 and 220.

Referring back to FIGS. 9 and 10, when the selected card is the trick card (YES in step S26), CPU 34 erases the information on the trick card brought in correspondence with the player having the current turn (step S28). Then, CPU 34 performs special processing defined in the trick card selected in step S28 (step S30). As described above, in the trick card, a function different from the function executable by the number card is defined. As this trick card is executed, for example, the sum value of all pieces on field 100 is increased or decreased by one. Then, the process returns to step S24.

On the other hand, when the selected card is not the trick card (NO in step S26), that is, when the number card is selected, CPU 34 determines whether or not the indication for selecting any type of piece on field 100 has been received from the player having the current turn (step S32). Namely, CPU 34 accepts selection of any one of the number cards (increment/decrement objects) distributed to each player and accepts selection of any one of the pieces (arranged objects) on field 100.

When the indication for selecting any type of piece has not been received from the player having the current turn (NO in step S32), the processing in step S32 is repeated. On the other hand, when the indication for selecting any type of piece has been received from the player having the current turn (YES in step S32), CPU 34 increases or decreases the sum value of the selected type of piece on field 100 by the number defined in the selected number card (step S34). Namely, CPU 34 increases or decreases the cumulative value of the selected piece (arranged object) on field 100 by the number defined in the selected number card (increment/decrement object).

Referring again to FIG. 19, for example, it is assumed that the user who participates in the game as player 1 touches a number card showing "+1" with stick 26 etc. on game device 10-1 and successively touches a position corresponding to a column of first piece 101. Then, the cumulative value of first piece 101 is updated from "2" to "3".

Referring back to FIGS. 9 and 10, CPU 34 erases the information on the number card selected in step S32, that has been brought in correspondence with the player having the current turn (step S36) and adds a new number card to the player having the current turn in accordance with the stock set in step S12 (step S38).

Thus, CPU 34 functions as a cumulative number update unit for updating the cumulative number of the piece (arranged object) of the designated type in accordance with at least one of an indication through the input portion and an indication from another player.

In succession, CPU 34 determines whether the cumulative number of any piece has attained to a prescribed number or not (step S40). Namely, the condition for end of the game includes a condition that the cumulative number of at least one type of piece (arranged object) has attained to the prescribed number, and CPU 34 functions as a game end determination unit for determining whether the condition for end of the game is satisfied or not.

When the cumulative number of any piece has attained to the prescribed number (YES in step S40), CPU 34 adds a goal bonus in correspondence with the player having the current turn (step S42). In succession, CPU 34 performs an evaluation sub routine (step S44). In this evaluation sub routine, processing for evaluating the player who participates in the present game is performed. Namely, CPU 34 functions as an evaluation unit for evaluating each player based on the cumulative number of the piece (arranged object) on field 100 set as the assigned piece of that player when it is determined that the condition for end of the game is satisfied. Details of the evaluation sub routine will be described later with reference to FIGS. 12 and 20.

On the other hand, when the cumulative number of any piece has not attained to the prescribed number (NO in step S40), CPU 34 decreases the currently remaining turns by one (step S46). Then, CPU 34 determines whether the updated number of remaining turns has attained to zero or not (step S48). Namely, the condition for end of the game includes a condition that the number of times of update of the cumulative value of the piece on field 100 has attained to the prescribed number (the number of turns), and CPU 34 functions as the game end determination unit for determining whether the condition for end of the game is satisfied or not.

When the updated number of remaining turns has not attained to zero (NO in step S48), CPU 34 sets a new turn for the player corresponding to the order of play next to the player that has had the previous turn (step S50). Then, the processing in step S22 and subsequent steps is repeated. Namely, the plurality of players alternately make selection of a piece (arranged object) on field 100 and selection of a number card (increment/decrement object) in accordance with the prescribed order of play.

When the turn moves to the player corresponding to the next order of play in step S50, CPU 34 outputs information for updating the displayed screen to the display of the game device itself and the display of another game device 10 (as necessary).

When the updated number of remaining turns has attained to zero (YES in step S48), CPU 34 determines whether or not the number of permitted times of judgment of any player has attained to a value other than zero (step S52). When the number of permitted times of judgment of all players has attained to zero (NO in step S52), CPU 34 performs the evaluation sub routine (step S44).

On the other hand, when the number of permitted times of judgment of any player has attained to a value other than zero (YES in step S52), CPU 34 extracts a player of which number of permitted times of judgment has attained to a value other than zero (step S54) and performs the judgment sub routine of the first player among the extracted players as the extra turn (step S56). After this judgment sub routine is performed, CPU 34 determines whether or not there is a player remaining for whom CPU 34 has not yet performed the judgment sub routine among the players extracted in step S54 (step S58).

When there is a player remaining for whom CPU 34 has not yet performed the judgment sub routine (YES in step S58), CPU 34 performs the judgment sub routine of the remaining player as the extra turn (step S56).

On the other hand, when there is no player remaining for whom CPU 34 has not yet performed the judgment sub routine (NO in step S58), CPU 34 performs the evaluation sub routine (step S44).

In addition, after the evaluation sub routine is performed (after step S44), CPU 34 determines whether end of the game has been indicated or not (step S62). When end of the game has not been indicated (NO in step S62), the processing in step S2 and subsequent steps is repeated. On the other hand, when end of the game has been indicated (YES in step S62), the processing relating to the present game ends.

(Judgment Sub Routine)

Referring to FIG. 11, initially, the current number of permitted times of judgment of the player who requested execution of the judgment processing is obtained (step S100) and whether the obtained current number of permitted times of judgment has attained to zero or not is determined (step S102).

When the obtained current number of permitted times of judgment has attained to zero (YES in step S102), CPU 34 has a message indicating that there is no permitted judgment remaining displayed to the player who requested execution of the judgment processing (step S104). Namely, CPU 34 functions as a disabling unit for disabling acceptance of designation in the judgment processing as to the user of which number of times of executed judgment processing has attained to the prescribed number. Then, the process returns.

On the other hand, when the obtained current number of permitted times of judgment has not attained to zero (NO in step S102), CPU 34 has a message urging the player to determine whether to perform the judgment processing or not displayed to the player having the current turn (step S106).

Referring again to FIG. 13, on game device 10-1 corresponding to player 1 having the current turn, a message that "do you wish to make judgment?" is displayed in indicator 210 and buttons 252 and 254 for entering user's intention for performing the judgment processing are displayed in a selectable manner. In addition, the current number of permitted times of judgment of player 1 is displayed in such a form as "(2 chances remaining)" in indicator 210. When the user who participates in the present game as player 1 touches "YES" button 252 with stick 26 etc., execution of the judgment processing is indicated. On the other hand, when "NO" button 254 is touched, cancel of the judgment processing is indicated.

On game device 10-2 corresponding to player 2 not having the current turn, a message notifying player 2 of the state of player 1 that "gentleman is thinking about whether to make judgment or not" is displayed in indicator 220.

Referring back to FIG. 11, CPU 34 determines whether execution of the judgment processing has been indicated or not (step S808). Namely, CPU 34 determines which of "YES" button 252 and "NO" button 254 (FIG. 13) was selected. When execution of the judgment processing was canceled, that is, when "NO" button 254 was selected (NO in step S108), the process returns.

On the other hand, when execution of the judgment processing was indicated, that is, when "YES" button 252 was selected (YES in step S108), CPU 34 determines whether or not the number of players who participate in the present game is three or more (step S110). When the number of players who participate in the present game is three or more (YES in step S110), CPU 34 determines whether an indication for selecting a player to be subjected to judgment processing has been received or not (step S112). When the indication for selecting a player to be subjected to judgment processing has not been received (NO in step S112), the processing in step S112 is repeated.

Figure 14:
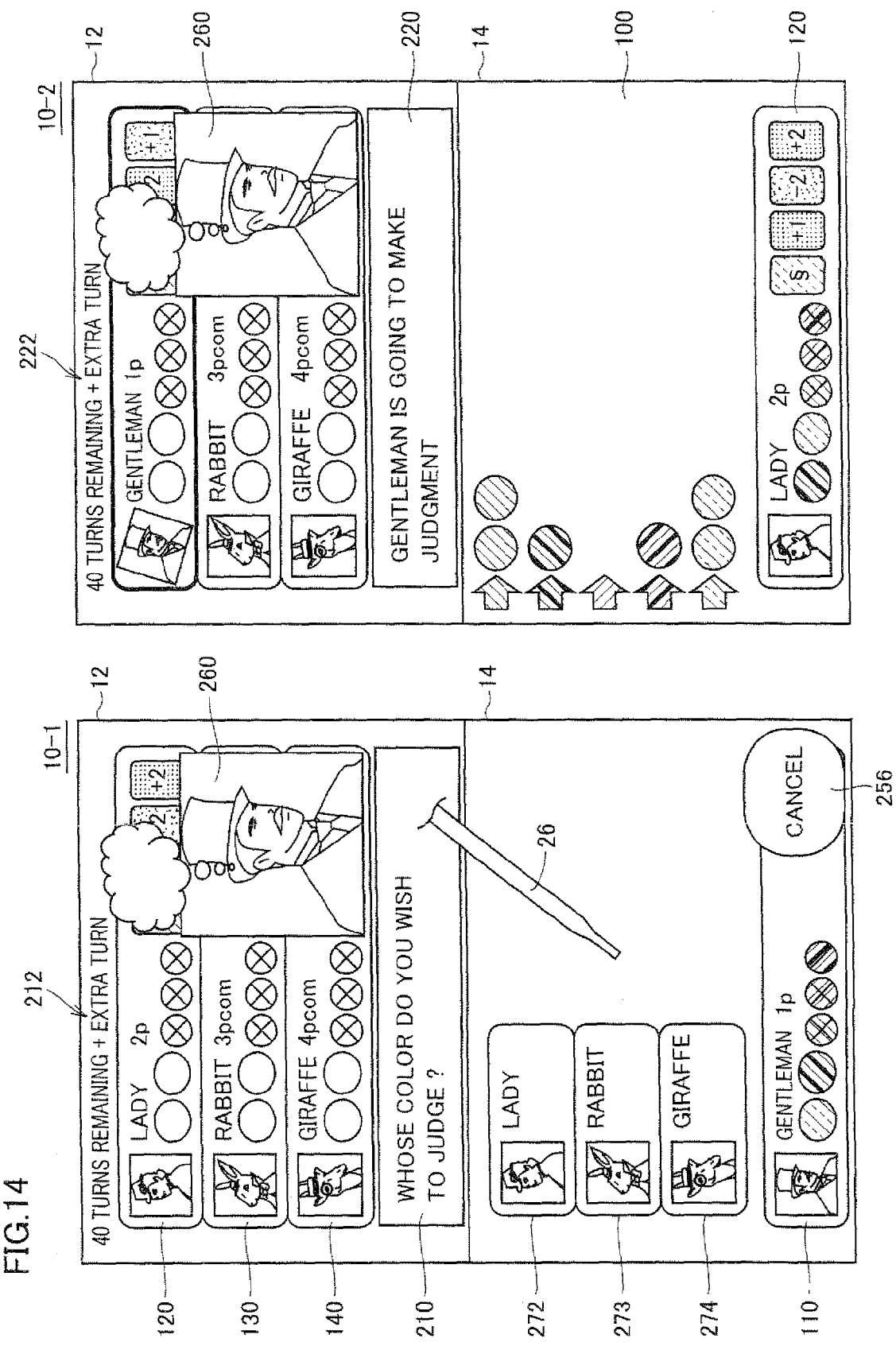
FIG. 14 is a diagram showing an output example (No. 2) on the display in the play-against-type game according to the embodiment of the present invention.

FIG. 14 shows an exemplary operation screen displayed in step S112. On game device 10-1 corresponding to player 1 having the current turn, selection images 272, 273 and 274 showing a list of other players to be subjected to judgment processing are displayed in a list in a selectable manner. For each of selection images 272, 273 and 274, a player name is displayed together with a character image of the corresponding player. In addition, a button 256 for indicating cancel of the judgment processing is also displayed in a selectable manner on game device 10-1. When the user who participates in the present game as player 1 touches any of selection images 272, 273 and 274 with stick 26 etc., selection for subjecting the player corresponding to the touched selection image to the judgment processing is indicated. Alternatively, when the user touches "cancel" button 256, cancel of the judgment processing is indicated.

On game device 10-1, a message urging the player to select a judgment processing target that "whose color do you wish to judge?" is displayed in indicator 210. On the other hand, on game device 10-2, a message notifying player 2 of the state of player 1 that "gentleman is going to make judgment" is shown in indicator 220. In addition, a character image 260 showing a player who is going to perform the judgment processing is also displayed on game devices 10-1 and 10-2.

When two players participate in the present game, that is, when the game is played on one-to-one basis, the processing in step S112 and screen display shown in FIG. 14 can be skipped, because, when the game is played on one-to-one basis, the player to be subjected to judgment processing is uniquely determined as the player other than the player himself/herself.

Referring back to FIG. 11, when an indication for selecting a player to be subjected to the judgment processing has been received (YES in step S112), CPU 34 determines whether or not both of two assigned pieces set for the selected player have already been disclosed owing to success in the judgment processing (step S114). If the set assigned pieces have all been disclosed, judgment processing for that player is not necessary. Therefore, the determination processing above is made for disabling the judgment processing in such a case.

When both of two assigned pieces set for the selected player have not yet been disclosed owing to success in the judgment processing (NO in step S114), CPU 34 determines whether or not all three pieces different from the assigned pieces set for the selected player have already been disclosed due to failure in the judgment processing (step S116). In the present embodiment, there are only five types of pieces on field 100. Accordingly, when three assigned pieces different from the set assigned pieces are disclosed, the set assigned pieces are substantially disclosed. Therefore, this determination processing is performed for avoiding addition of a judgment bonus owing to success in the judgment processing in such a situation.

When all three pieces different from the assigned pieces set for the selected player have not yet been disclosed due to failure in the judgment processing (NO in step S116), CPU 34 determines whether the present judgment is judgment for the third time in total as to the selected player or not (step S117).

When both of two assigned pieces set for the selected player have already been disclosed owing to success in the judgment processing (YES in step S114), when all three pieces different from the assigned pieces set for the selected player have already been disclosed due to failure in the judgment processing (YES in step S116), or when the present judgment is judgment for the third time in total as to the selected player (YES in step S117), CPU 34 has a message indicating that judgment as to the selected player cannot be made displayed to the player who requested execution of the judgment processing (step S118). Then, the process returns. After step S118 is performed, determination processing, for selecting a player to be subjected to the judgment processing shown in step S112 may again be performed.

When the number of players who participate in the game is three or more in the present embodiment, six or more types of pieces are preferably arranged on field 100, for the following reasons.

Specifically, in the present embodiment, two types of assigned pieces are allocated to each player and each player is permitted to fail in judgment three times (the number of permitted failures is set to three) (determination is made in step S116 in FIG. 11). Accordingly, in an example where five types of pieces are arranged on field 100, at the time point when judgment as to a certain player failed three times, it is virtually turned out that remaining two types of pieces are the assigned pieces of that player in spite of failure in judgment. Therefore, by arranging six or more types of pieces on field 100, two assigned pieces of that player should be guessed from remaining three types of pieces in spite of failure in judgment as to the certain player three times, and hence such an event that the assigned pieces of the certain player are virtually revealed in spite of complete failure in judgment can be avoided. Here, the number of times that other players can make judgment over a specific player (hereinafter also referred to as "the maximum number of times of being judged") is set to four at the maximum, until the number of times of failure in judgment attains to three or the number of times of success in judgment attains to two.

The description above is generalized as follows. Assuming that a types of assigned pieces are allocated to a certain player and the number of permitted failures is set to b, the number of types of pieces to be arranged on field 100 is preferably set to a value not smaller than "a+b+1". In addition, the number of times of permitted judgment over one player (the maximum number of times of being judged) can be set to a value not greater than "a+b−1". Namely, when the number of players who participate in the game is three or more in the present embodiment, the value of a is set to "2" and the value of b is set to "3", and therefore the number of types of pieces arranged on field 100 is preferably set to "6" or more. Here, the maximum number of times of being judged can be set to "4" or smaller. Alternatively, when two players play the game on one-to-one basis, the value of a is set to "2" and the value of b is set to "12", and therefore the number of types of the pieces arranged on field 100 is preferably set to "5" or more. Here, the maximum number of times of being judged can be set to "3" or smaller. Therefore, in the present embodiment described above, the number of types of pieces arranged on field 100 is set to "5" and the maximum number of times of being judged is set to "2".

In other words, in an example where "a+b+1" types (in the present embodiment, "5" types) of pieces are arranged on field 100, attention being paid to a certain player, the player may be subjected to judgment by other players "a+b−1" times or less (for example, "3" times or less; in the present embodiment, "2" times) in total. In case a types (in the present embodiment, "2" types") of assigned colors set for a certain player have all been disclosed, judgment as to that player is not permitted. In addition, in a case where judgment as to the certain player failed b times (in the present embodiment, "2" times) as well, judgment as to that player is not permitted.

When the number of players who participate in the present game is not three or more (NO in step S110) or when the present judgment as to the selected player is not judgment for the third time in total (NO in step S117), CPU 34 determines whether an indication for selecting a type of the piece has been received from the player having the current turn or not (step S120).

In the present embodiment, for example, as the number of permitted times of judgment is set to "2" as the initial value (maximum value), in an example where two players participate in the present game, that is, the game is played on one-to-one basis, judgment processing for the third time does not exist. Accordingly, the determination processing in step S114 will result in NO at any time. Therefore, when the game is played on one-to-one basis, the determination processing in step S114 can be skipped. For similar reasons, the determination processing in step S116 will result in NO at any time. Therefore, when the number of permitted times of judgment is set to "2" and when the number of times of judgment as to one player exceeds neither the number of assigned pieces nor the number of permitted failures as in the game on one-to-one basis, the determination processing in step S116 can also be skipped.

When the indication for selecting a type of the piece has not been received from the player having the current turn (NO in step S120), the processing in step S120 is repeated. Namely, CPU 34 functions as an assigned object type designation unit for accepting designation of the type of the assigned piece (assigned object) set for a specific player.

FIG. 15 shows an exemplary operation screen displayed in step S120. On game device 10-1 corresponding to player 1 having the current turn, arbitrary selection from among five types of pieces in correspondence with respective columns on field 100 can be made. Here, the user who participates in the game as player 1 touches a column corresponding to a piece estimated as the assigned piece of the player designated as the target of the judgment processing with stick 26 etc. to indicate selection of the corresponding type of the piece. When the user touches "cancel" button 256, cancel of the judgment processing is indicated.

On game device 10-1, a message of "which color?" urging the player to select the type of the piece is shown in indicator 210. On the other hand, on game device 10-2, a message notifying player 2 of the state of player 1 that "gentleman is guessing color" is shown in indicator 220. In addition, on game devices 10-1 and 10-2, in addition to character image 260 showing the player who is going to perform the judgment processing, a character image 262 showing a player designated as the target of the judgment processing is displayed.

Referring back to FIG. 1, when the indication for selecting a type of the piece has been received from the player having the current turn (YES in step S120), CPU 34 decreases the current number of permitted times of judgment of the player who requested execution of the judgment processing by 1 (step S122). Namely, CPU 34 functions as a number-of-times detection unit for detecting the number of times of execution of the judgment processing of each player. Then, CPU 34 sums up the number of times that the selected player was judged (step S123). Namely, CPU 34 sums up the number of times of execution of judgment for determining whether the maximum number of times of being judged in step S117 described above has been attained or not. In addition, CPU 34 obtains the assigned piece set for the player to be judged (step S124) and determines whether or not the type of the assigned piece selected in step S120 matches with the type of the assigned piece set for the player to be judged, that was obtained in step S124 (step S126). Namely, CPU 34 functions as a matching determination unit for determining whether or not the type of the designated assigned piece (assigned object) matches with the type of the assigned object set for the specific player. Then, CPU 34 evaluates the player also based on the result of determination in the judgment processing.

When the selected type of the assigned piece matches with the type of the assigned piece set for the player to be judged (YES in step S126), CPU 34 has a message indicating that the judgment processing was successful displayed (step S128). In succession, CPU 34 varies a manner of display of the assigned piece of which type was revealed among the assigned pieces set for the judged player as a result of success in the judgment processing, to a manner identifiable by other players (step S330). Namely, when it is determined that the type of the piece designated in the judgment processing matches with the type of the set assigned piece, CPU 34 varies a manner of display of the assigned piece set for the player subjected to the judgment processing from a manner unidentifiable by other players to an identifiable manner.

In addition, CPU 34 adds a judgment bonus in correspondence with the player who performed the judgment processing (step S132). Namely, when it is determined that the type of the piece designated in the judgment processing matches with the type of the assigned piece, CPU 34 evaluates the player who gave designation in the judgment processing relatively higher than the player subjected to the judgment processing. Then, the process returns.

On the other hand, when the type of the selected assigned piece did not match with the type of the assigned piece set for the judged player (NO in step S126), CPU 34 has a message indicating failure in the judgment processing, displayed (step S134). In succession CPU 34 varies a manner of display of the piece turned out to be different in type from the assigned piece set for the judged player as a result of failure in the judgment processing to a manner identifiable by other players (step S136).

In addition, CPU 34 adds a fake bonus in correspondence with the player subjected to the judgment processing (step S138). Namely, when it is determined that the type of the piece designated in the judgment processing does not match with the type of the assigned piece, CPU 34 evaluates the player subjected to the judgment processing relatively higher than the player who gave designation in the judgment processing. Then, the process returns.

Figure 16A:
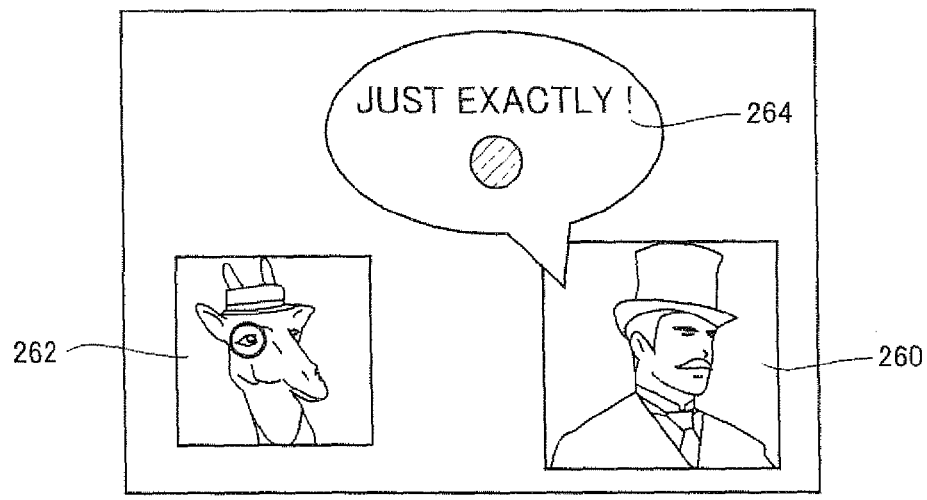
FIGS. 16A to 16C are diagrams showing an output example No. 4) on the display in the play-against-type game according to the embodiment of the present invention.

Referring again to FIG. 15, for example, when the user who participates in the game as player 1 touches a position corresponding to a column of fifth piece 105 with stick 26 etc., an operation screen as shown in FIG. 16A is displayed on game device 10-1 and game device 10-2. Namely, in the operation screen shown in FIG. 16A, character image 260 showing the player who is going to perform the judgment processing and character image 262 showing the player designated as the target of the judgment processing are displayed, and a balloon object 264 showing the selected type of the piece subjected to the judgment processing is displayed. Namely, such an effect, as showing the judgment processing in progress is provided.

Figure 16B:
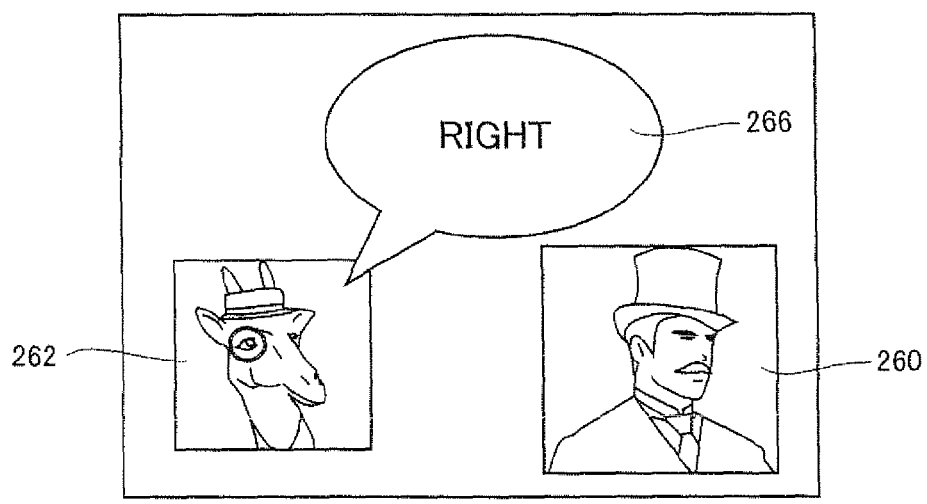
Figure 17A:
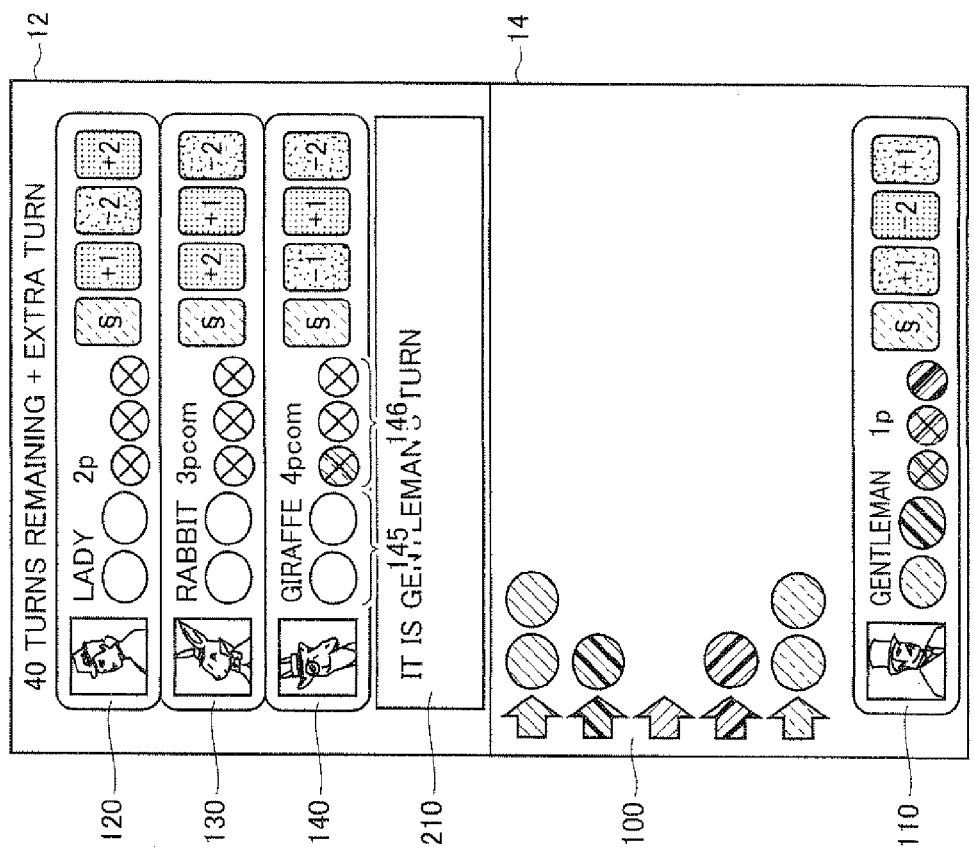
FIGS. 17A and 17B are diagrams showing an output example (No. 5) on the display in the play-against-type game according to the embodiment of the present invention.

When the selected type of the assigned piece matches with the type of the assigned piece set for the judged player, a balloon object 266 showing "right" as shown in FIG. 16B is displayed on game device 10-1 and game device 10-2. Namely, such an effect as showing success in the judgment processing is provided. In addition, when the judgment processing was successful, an operation screen as shown in FIG. 17A is displayed on game device 10-1. In this operation screen, the type of the assigned piece disclosed in the judgment processing is displayed in success information 145 in player information 140 associated with player 4 subjected to the judgment processing.

Figure 16C:
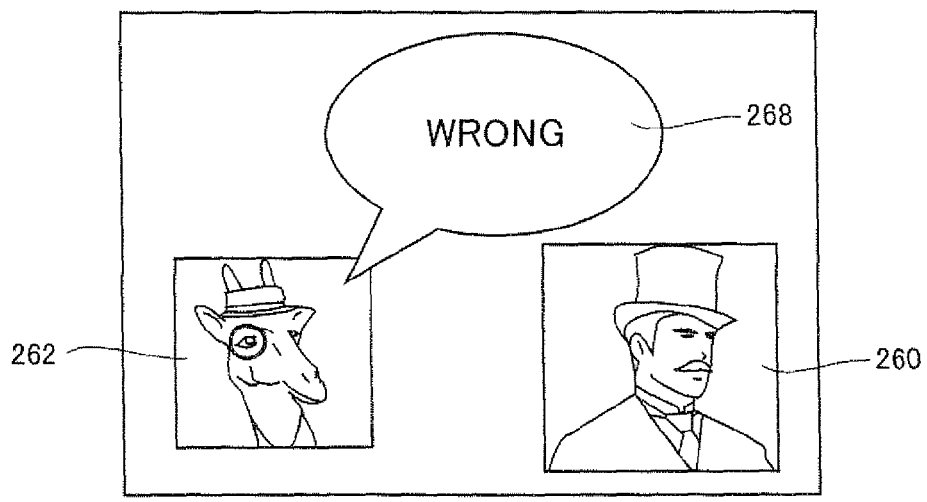
Figure 17B:
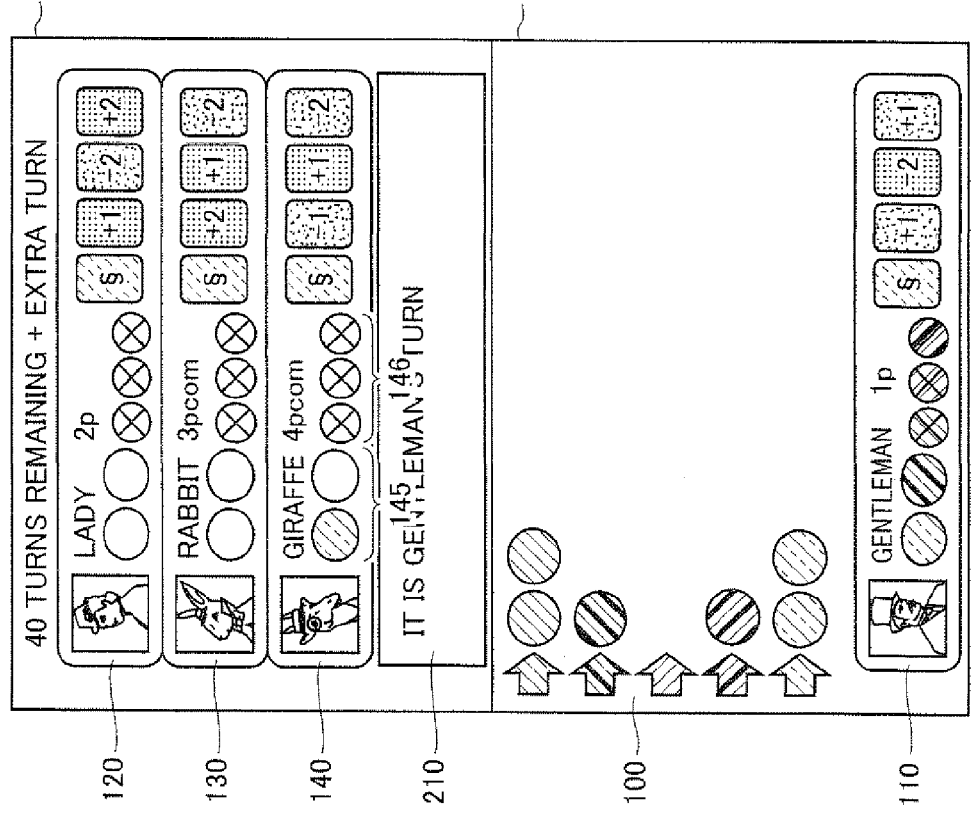

On the other hand, when the selected type of the assigned piece does not match with the type of the assigned piece set for the judged player, a balloon object 268 showing "wrong" as shown in FIG. 16C is displayed on game device 10-1 and game device 10-2. Namely, such an effect as showing failure in the judgment processing is provided. In addition, when the judgment processing fails, an operation screen as shown in FIG. 17B is displayed on game device 10-1. In this operation screen, the type of the piece turned out in the judgment processing as unmatching assigned piece is displayed in failure information 146 in player information 140 associated with player 4 subjected to the judgment processing.

(Evaluation Sub Routine)

Referring to FIG. 12, initially, CPU 34 sets the first player who participates in the present game as the target (step S200). In succession, CPU 34 obtains the cumulative values of the respective assigned pieces set for the target player (step S202) and determines whether at least one of the obtained respective cumulative values is zero or not (step S204).

When at least one of the obtained respective cumulative values is zero (YES in step S204), CPU 34 sets a regular point to zero (step S206). Namely, when at least one of the cumulative numbers of the set assigned pieces is equal to or smaller than a prescribed threshold value, CPU 34 sets a corresponding evaluation value to a minimum point, for each player.

On the other hand, when none of the obtained respective cumulative values is zero 0 in step S204), CPU 34 adopts a difference (absolute value) between the cumulative values of the respective assigned pieces as the regular point (step S208). Here, as the difference in the cumulative value between the respective pieces set as the assigned pieces is greater, CPU 34 calculates a higher evaluation value for each player.

After step S206 or step S208, CPU 34 calculates the total of the "regular point", the "goal bonus", the "judgment bonus!", and the "fake bonus" as final points (step S210). Namely, CPU 34 functions as an evaluation value calculation unit for calculating an evaluation value for each player.

Thereafter, CPU 34 determines whether calculation of the final points for all players who participate in the present game has been completed or not (step S212). When calculation of the final points for all players who participate in the present game has not yet been completed (NO in step S212), CPU 34 sets the next player who participates in the present game as the target (step S214). Then, the processing in step S202 and subsequent steps is repeated.

On the other hand, when calculation of the final points for all players who participate in the present game has been completed (YES in step S212), CPU 34 causes the display of the game device itself and the display of another game device 10 (as necessary) to display a result screen showing the calculated final points and detailed points of each player (step S216).

Figure 20:
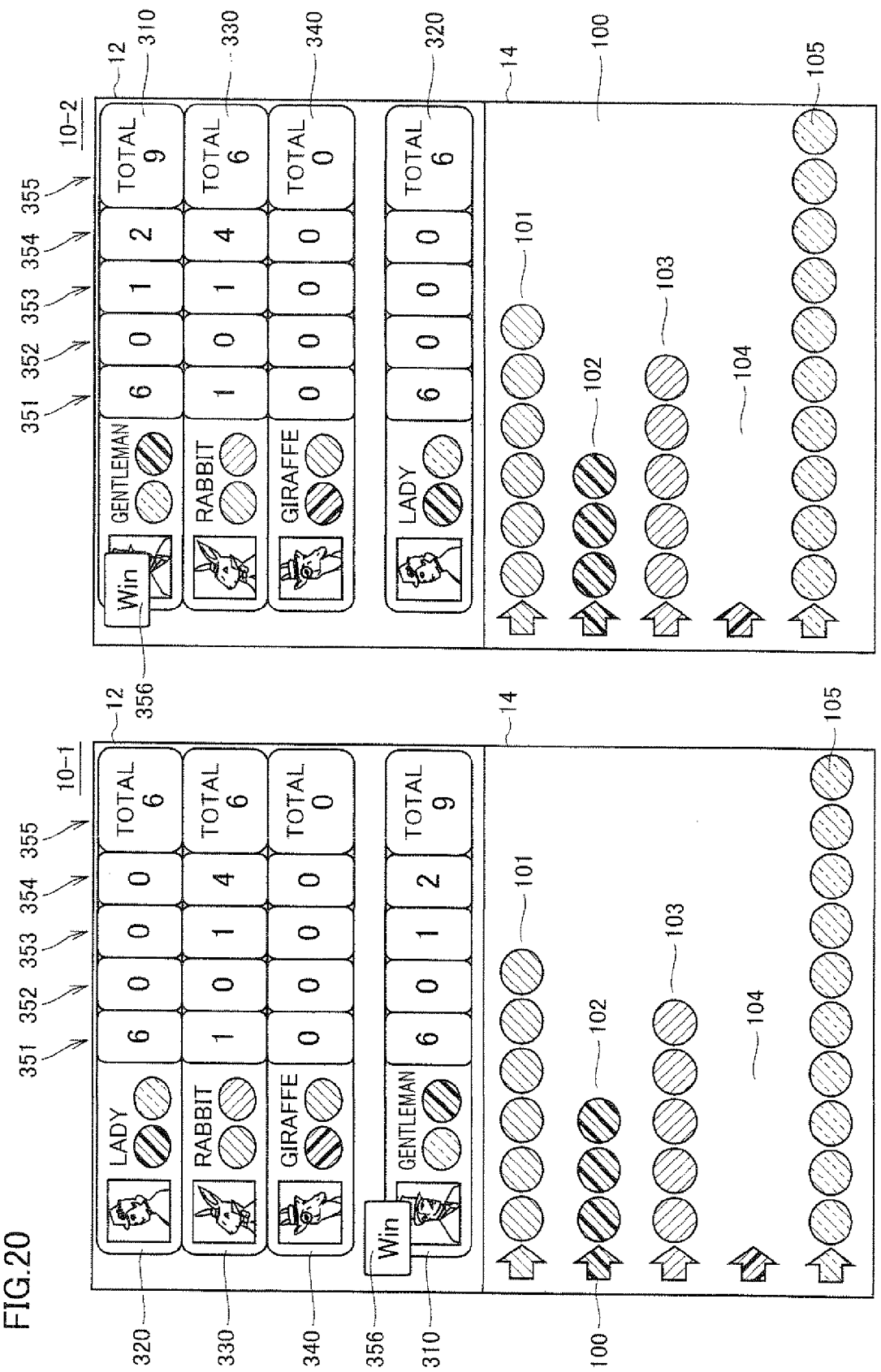
FIG. 20 is a diagram showing an output example (No. 8) on the display in the play-against-type game according to the embodiment of the present invention.

FIG. 20 shows an exemplary operation screen displayed in step S216. In the operation screen shown in FIG. 20, evaluation value information 310, 320, 330, and 340 on respective players 1 to 4 is displayed. Each piece of evaluation value information 310, 320, 330, and 340 includes a numeric value 355 indicating the final points calculated for the corresponding player. In addition, each piece of evaluation value information 310, 320, 330, and 340 includes a numeric value 351 indicating the "regular point", a numeric value 352 indicating the "goal bonus", a numeric value 353 indicating the "judgment bonus", and a numeric value 354 indicating the "fake bonus", that are breakdown of numeric value 355.

In addition, in the operation screen shown in FIG. 20, an object 356' indicating the winner determined based on the final points is displayed in association with the corresponding character. For example, in FIG. 20, object 356 labeled as "Win" is displayed over the winner who gained the highest final points among the players who participated in the present game.

Referring back to FIG. 12, CPU 34 determines the winner among the players who participate in the present game based on the final points of each player (step S218) and causes the display of the game device itself and the display of another game device 10 (as necessary) to display the result of victory and defeat (step S220). Namely, CPU 34 functions as a winner determination unit for determining a winner among the plurality of players based on the evaluation value of each player. Then, the process returns.

(Display During Game in Progress)

Figure 21:
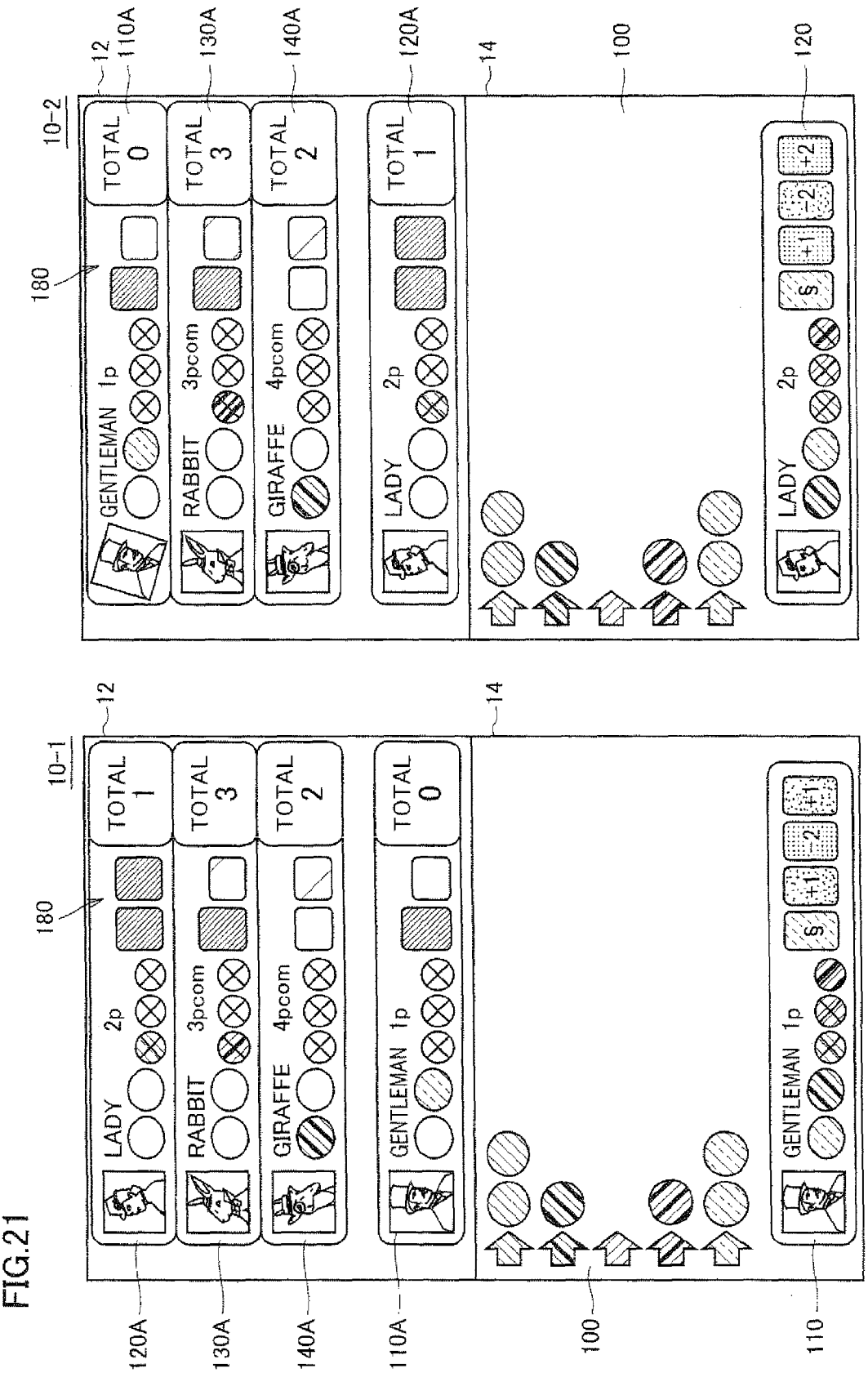
FIG. 21 is a diagram showing an output example (No. 9) on the display in the play-against-type game according to the embodiment of the present invention.

When a specific switch (typically, operation switch 22L or 22R) of operation switch 22 of game device 10 is selected while the play-against-type game according to the present embodiment is in progress, player information 110A, 120A, 130A, and 140A as shown in FIG. 21 instead of player information 110, 120, 130, and 140 is displayed on game device 10.

Such player information 110A, 120A, 130A, and 140A shown in FIG. 21 includes a result of the judgment processing as to the corresponding player by other players and the final points at the present time point. Namely, in each piece of player information 110A, 120A, 130A, and 140A, a state that the piece has been disclosed as the piece set for the corresponding player as a result of success in the judgment processing as to the corresponding player and a state that the piece is turned out to be the piece not set for the corresponding player as a result of failure in the judgment processing as to the corresponding player are displayed in an identifiable manner.

In addition, each piece of player information 110A, 120A, 130A, and 140A includes an icon 180 indicating the judgment bonus for the corresponding player. Namely, icon 180 included in each piece of the player information is displayed as two images in a card shape in correspondence with "2" representing the initial value of the number of permitted times of judgment, and a manner of display thereof is varied such that the image in the card shape on the left represents the judgment bonus obtained in the first judgment and the image in the card shape on the right represents the judgment bonus obtained in the second judgment. For example, when a player was successful in the first judgment and gained two judgment bonus points, the image in the card shape on the left is displayed to indicate "2". Alternatively, when the player failed in the second judgment, the image in the card shape on the right is displayed to indicate "0" because 0 judgment bonus was gained.

<Exchange of Data with Another Game Device>

As shown in FIG. 8 above, in the present embodiment, client processes 341 to 344 brought in correspondence with the plurality of players who participate in the present game respectively are performed for one host process 340 and data is exchanged among these processes. Such data exchange will be described hereinafter with reference to FIG. 22.

In the play-against-type game according to the present embodiment, the "turn" is set for each player in the prescribed order of play. Therefore, in FIG. 22, data exchange with host process 340 will be described, with the client process having the turn and the client process not having the turn being distinguished from each other.

Referring to FIG. 22, when the present game is started, initially, (1) initial processing is performed. The initial processing corresponds to the processing in steps S2 to S16 and the like in the flowchart shown in FIG. 9. In the initial processing, the host process notifies all the client processes of the assigned pieces of each player (sequence SQ402). In succession, the host process notifies all the client processes of the number cards to each player and the trick card to each player (sequence SQ404). In addition, the host process notifies all the client processes of information on initial arrangement of the pieces on the field (sequence SQ406).

When the initial processing ends, (2) turn start processing for starting progress of the game is performed. The turn start processing corresponds to the processing in Step S18 and the like in the flowchart shown in FIG. 9. In the turn start processing, the host process notifies the client process that should have the first turn of the turn setting (sequence SQ408).

In succession, (3) judgment processing and (4) piece arrangement processing corresponding to the processing for one turn of each player are started. The judgment processing corresponds to the processing in step S22 in the flowchart shown in FIG. 9, the judgment sub routine shown in FIG. 11, and the like. In addition, the piece arrangement processing corresponds to the processing in steps S24 to S46 and the like in the flowcharts shown in FIGS. 9 and 10.

When the corresponding user indicates execution of the judgment processing, the client process having the turn notifies the host process of a request for performing the judgment processing (sequence SQ410). Then, the host process notifies the client process not having the turn of a message indicating that the player having the turn is performing the judgment processing (sequence SQ412).

In addition, in response to the corresponding user operation, the client process having the turn notifies the host process of the selected player (sequence SQ414). Then, the host process notifies the client process not having the turn of a message indicating the selected player (sequence SQ416).

When the game is played on one-to-one basis, the player to be judged may automatically be selected without responding to the user's operation and notification of the automatically selected player may be given.

Moreover, in response to the corresponding user operation, the client process having the turn notifies the host process of the selected type of the piece (sequence SQ418). Then, the host process notifies the client process not having the turn of a message indicating the selected piece (sequence SQ420). In succession, the host process notifies all the client processes of a result of the judgment processing (sequence SQ422).

On the other hand, when the corresponding user did not indicate execution of the judgment processing or when the corresponding user canceled the judgment processing in progress, the client process having the turn notifies the host process of non-selection of the judgment processing (sequence SQ424). Then, the host process notifies the client process not having the turn of a message indicating that the judgment processing was not selected (sequence SQ426).

In succession, (4) piece arrangement processing is performed. In the piece arrangement processing, in response to the corresponding user operation, the client process having the turn notifies the host process of the selected number card (sequence SQ428). Then, the host process notifies the client process not having the turn of a message indicating the selected number card (sequence SQ430).

In addition, in response to the corresponding user operation, the client process having the turn notifies the host process of the selected type of the piece (sequence SQ432). Then, the host process notifies the client process not having the turn of a message indicating the selected type of the piece (sequence SQ434). In succession, the host process notifies all the client processes of information on updated arrangement of the pieces on the field (sequence SQ436). Moreover, the host process notifies all the client processes of the added number card (sequence SQ438).

(2) Turn start processing, (3) judgment processing and (4) piece arrangement processing described above are repeatedly performed until the condition for end of the game is satisfied.

If an extra turn is present after the condition for end of the game is satisfied, processing similar to (2) turn start processing and (3) judgment processing is performed.

Thereafter, (6) evaluation processing is performed. In the evaluation processing, the host process notifies all the client processes of the evaluation result (sequence SQ440).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A game device providing a play-against-type game in which a plurality of players can participate, comprising:
   an input portion;
   a display;
   a cumulative number display unit for displaying cumulative numbers for each type of respective three or more types of arranged objects;
   an assigned object setting unit for setting, for each player, at least two types of arranged objects obtained by extracting a part of said three or more types of arranged objects as assigned objects of that player,
   a cumulative number update unit for updating the cumulative number of the arranged object of a designated type, in accordance with at least one of an indication through said input portion and an indication from one or more of the plurality of players;

a game end determination unit for determining whether a condition for end of the game is satisfied; and an evaluation unit for evaluating each player based on the respective cumulative numbers of said at least two types of arranged objects set as said assigned objects for each player when it is determined that said condition for end of the game is satisfied.

2. A game system providing a play-against-type game in which a plurality of players can participate, comprising:

a first terminal device associated with a first player and including a first input portion and a first display;

a second terminal device associated with a second player and including a second input portion and a second display;

a cumulative number display unit for causing said first and second displays to display cumulative numbers for each type of respective three or more types of arranged objects;

an assigned object setting unit for setting, for each of at least said first and second players, at least two types of arranged objects obtained by extracting a part of said three or more types of arranged objects as assigned objects of that player, a cumulative number update unit for updating the cumulative number of a designated type of arranged object, in accordance with an indication through at least one of said first and second input portions;

a game end determination unit for determining whether a condition for end of the game is satisfied, and an evaluation unit for evaluating each player based on the respective cumulative numbers of said at least two types of arranged objects set as said assigned objects for each player when it is determined that said condition for end of the game is satisfied.

3. The game system according to claim 2, further comprising:

a first assigned object display control unit for causing said first display to display said assigned object set for said first player in an identifiable manner and to display said assigned object set for said second player in an unidentifiable manner;

a second assigned object display control unit for causing said second display to display said assigned object set for said second player in an identifiable manner and to display said assigned object set for said first player in an unidentifiable manner;

an assigned object type designation unit for accepting, through said first input portion, designation of the type of said assigned object set for said second player, from said first player; and a matching determination unit for determining whether the designated type of the assigned object matches with the type of the assigned object set for said second player, wherein said evaluation unit is configured to make evaluation also based on a result of determination by said matching determination unit.

4. The game system according to claim 2, wherein the plurality of players who participate in said play-against-type game, including said first and second players, sequentially provide an indication for updating the cumulative number of said arranged object in accordance with a prescribed order, until it is determined that said condition for end of the game is satisfied.

5. A method implemented for providing a play-against-type game in which a plurality of players can participate, in a game device having an input portion, a display, and one or more processors, the method comprising:

displaying cumulative numbers for each type of respective three or more types of arranged objects;

setting, for each player, at least two types of arranged objects obtained by extracting a part of said three or more types of arranged objects as assigned objects of that player;

updating the cumulative number of the arranged object of a designated type, in accordance with at least one of an indication through said input portion and an indication from one or more of the plurality of players;

determining whether a condition for end of the game is satisfied; and evaluating, via the one or more processors, each player based on the respective cumulative numbers of said at least two types of arranged objects set as said assigned objects for each player when it is determined that said condition for end of the game is satisfied.

6. A non-transitory storage medium storing a game program for providing a play-against-type game in which a plurality of players can participate, in a game device having an input portion and a display, said game program including cumulative number display instructions for displaying cumulative numbers for each type of respective three or more types of arranged objects, assigned object setting instructions for setting, for each player, at least two types of arranged objects obtained by extracting a part of said three or more types of arranged objects as assigned objects of that player, cumulative number update instructions for updating the cumulative number of the arranged object of a designated type, in accordance with at least one of an indication through said input portion and an indication from one or more of the plurality of players, game end determination instructions for determining whether a condition for end of the game is satisfied, and evaluation instructions for evaluating each player based on the respective cumulative numbers of said at least two types of arranged objects set as said assigned objects for each player when it is determined that said condition for end of the game is satisfied.

7. The non-transitory storage medium storing a game program according to claim 6, wherein said condition for end of the game includes a condition that the cumulative number of at least one type of arranged object has attained a prescribed number.

8. The non-transitory storage medium storing a game program according to claim 6, wherein said condition for end of the game includes a condition that the number of times of update in accordance with said cumulative number update instructions has attained a prescribed number.

9. The non-transitory storage medium storing a game program according to claim 6, wherein said evaluation instructions include evaluation value calculation instructions for calculating an evaluation value of each player, and winner determination instructions for determining a winner among said plurality of players based on the evaluation value of each player, each of said assigned objects set for each of the plurality of players includes first and second arranged objects, and said evaluation value calculation instructions are adapted to calculate, for each player, a higher evaluation value as a difference between a cumulative number of corresponding said first arranged object and a cumulative number of corresponding said second arranged object is greater.

10. The non-transitory storage medium storing a game program according to claim 9, wherein
said evaluation value calculation instructions are adapted to set for each player, a corresponding evaluation value to a minimum value when at least one of the cumulative number of said corresponding first arranged object and the cumulative number of said corresponding second arranged object is equal to or lower than a prescribed threshold value.

11. The non-transitory storage medium storing a game program according to claim 9, wherein
said evaluation value calculation instructions are adapted to set for each player, a corresponding evaluation value to a lower value when at least one of the cumulative number of said corresponding first arranged object and the cumulative number of said corresponding second arranged object is equal to or lower than a prescribed threshold value.

12. The non-transitory storage medium storing a game program according to claim 6, wherein
any of said three or more types of arranged objects can be designated as an arranged object to be subjected to cumulative number update processing in accordance with said cumulative number update instructions.

13. The non-transitory storage medium storing a game program according to claim 6, wherein
said game program further includes distribution instructions for distributing at least one increment object and/or decrement object in which increment and/or decrement of the cumulative value of said arranged object is defined to each player, and
said cumulative number update instructions include
instructions for accepting selection of at least one of said increment objects and/or said decrement objects distributed to each player,
instructions for accepting selection of any one of said three or more types of arranged objects, and
instructions for increasing or decreasing the cumulative value of the selected arranged object by a number defined in the selected increment object or decrement object.

14. The non-transitory storage medium storing a game program according to claim 13, wherein
said plurality of players make selection of said arranged object and said increment object and/or decrement object in accordance with a prescribed order.

15. The non-transitory storage medium storing a game program according to claim 13, wherein
said distribution instructions include increment/decrement object display instructions for displaying contents of said increment object and/or decrement object distributed to each player in a manner identifiable by other players.

16. The non-transitory storage medium storing a game program according to claim 13, wherein
said distribution instructions include special object distribution instructions for distributing a special object defining contents of special processing for proceeding with the game in addition to said increment object and/or said decrement object to each player, and said increment object and/or said decrement object and said special object are displayed in a manner freely selectable by the player.

17. The non-transitory storage medium storing a game program according to claim 6, wherein
said assigned object setting instructions include assigned object display instructions for displaying, among said assigned objects set for respective players, only said assigned object set for the player in an identifiable manner and displaying said assigned object set for each of the other plurality of players in an unidentifiable manner.

18. The non-transitory storage medium storing a game program according to claim 17, wherein
said game program further includes
assigned object type designation instructions for accepting designation of a type of said assigned object set for a specific player of the plurality of players, and
matching determination instructions for determining whether the designated type of the assigned object matches with the type of the assigned object set for the specific player, and
said evaluation instructions are adapted for evaluation also based on a result of determination obtained by executing said matching determination instructions.

19. The non-transitory storage medium storing a game program according to claim 18, wherein
said evaluation instructions are adapted to evaluate the player who provided designation relatively higher than the specific player when it is determined that matching of the type of the object was achieved as a result of execution of said matching determination instructions.

20. The non-transitory storage medium storing a game program according to claim 18, wherein
said evaluation instructions are adapted to evaluate the specific player relatively higher than the player who provided designation when it is determined that matching of the type of the object was not achieved as a result of execution of said matching determination instructions.

21. The non-transitory storage medium storing a game program according to claim 18, wherein
said assigned object display instructions are adapted to vary a manner of display of the assigned object set for the specific player from a manner unidentifiable by other players to an identifiable manner when it is determined that matching of the type of the object was achieved as a result of execution of said matching determination instructions.

22. The non-transitory storage medium storing a game program according to claim 18, wherein
said game program further includes
number-of-times detection instructions for detecting the number of times of acceptance of designation of the type of the assigned object set for said specific player, for each player, and
disabling instructions for disabling acceptance of designation in accordance with said assigned object type designation instructions as to a user of which number of times of detection as a result of execution of said number-of-times detection instructions has attained to a prescribed number.

* * * * *